(12) United States Patent
Goldhamer

(10) Patent No.: US 12,245,300 B2
(45) Date of Patent: Mar. 4, 2025

(54) APPLICATION LAYER COMMUNICATIONS IN CELLULAR NETWORKS

(71) Applicant: Mariana Goldhamer, Ramat Gan (IL)

(72) Inventor: Mariana Goldhamer, Ramat Gan (IL)

( * ) Notice: Subject to any disclaimer, the term of this patent is extended or adjusted under 35 U.S.C. 154(b) by 600 days.

(21) Appl. No.: 17/523,187

(22) Filed: Nov. 10, 2021

(65) Prior Publication Data

US 2022/0150998 A1    May 12, 2022

Related U.S. Application Data

(60) Provisional application No. 63/111,764, filed on Nov. 10, 2020.

(51) Int. Cl.
| | |
|---|---|
| *H04W 76/14* | (2018.01) |
| *H04W 76/15* | (2018.01) |
| *H04W 76/18* | (2018.01) |
| *H04W 88/02* | (2009.01) |

(52) U.S. Cl.
CPC .......... *H04W 76/14* (2018.02); *H04W 76/15* (2018.02); *H04W 76/18* (2018.02); *H04W 88/026* (2013.01)

(58) Field of Classification Search
CPC ..... H04W 76/14; H04W 76/15; H04W 76/18; H04W 88/026
See application file for complete search history.

(56) References Cited

U.S. PATENT DOCUMENTS

| | | | |
|---|---|---|---|
| 11,350,388 B2* | 5/2022 | Goldhamer | H04W 4/70 |
| 2016/0381491 A1* | 12/2016 | Watfa | H04W 4/023 |
| | | | 455/41.2 |
| 2018/0324575 A1* | 11/2018 | Qi | H04B 5/70 |
| 2019/0342800 A1 | 11/2019 | Sirotkin et al. | |
| 2020/0296696 A1 | 9/2020 | Goldhamer | |

OTHER PUBLICATIONS

3GPP TS 23.287 V16.3.0 (Jul. 2020), "Vehicle-to-Everything (V2X) services" (Release 16).
3GPP TS 36.423 V16.2.0 (Jul. 2020), "X2 application protocol (X2AP)" (Release 16).
3GPP TS 38.423 V16.2.0 (Jul. 2020), "Xn application protocol (XnAP)" (Release 16).

* cited by examiner

*Primary Examiner* — Melvin C Marcelo

(57) ABSTRACT

A first application client on a first UE served by a first RAN (Radio Access Network) node, and a second application client on a second UE served by a second RAN node connect to a specific application server. The application server requests to establish a connection between the two application clients.
The first RAN node identifies the second RAN node serving the second UE and a connection within RAN and passing through the first and the second RAN nodes is established between the first UE and the second UE. Application user data is conveyed between the first application client on the first UE and the second application client on the second UE through the serving RAN nodes.
At least one of the two UEs may use a radio interface not allowing wireless communication with another UE.
The first and the second RAN nodes may be the same node.

21 Claims, 11 Drawing Sheets

AGV  AUTOMATED GUIDED VEHICLE
HM   HUMAN MACHINE INTERFACE
M    MACHINE
PLC  PROGRAMMABLE LOCAL CONTROLLER
R    ROBOT
S/A  SENSOR / ACTUATOR

APPLICATION LAYER COMMUNICATIONS IN CELLULAR NETWORKS

CROSS-REFERENCE TO RELATED APPLICATIONS

This application claims priority from the U.S. provisional patent application No. 63/111,764, entitled "SIDELINK AND BASE STATIONS IN AUTOMATION AND V2X", filed on Nov. 10, 2020, which is incorporated herein by reference in its entirety, while omitting the text related to the parent application.

FIELD OF THE INVENTION

The invention relates generally to digital communication systems and in particular to cellular systems distributing information over radio in industry automation and automotive applications.

The list of abbreviations used in this document is provided at the end of this specification.

BACKGROUND OF THE INVENTION 5G technology includes important modifications for supporting URLLC (Ultra-Reliable Low-Latency Communication) over Uu (base station to user equipment air interface) and Sidelink (SL) or PC5 (UE-to-UE air interface).

Due to these modifications, 5G becomes attractive for use in industrial automation; the current solution is however slow, complicated and expensive, as includes core system or core network components on factory premises.

As a continuation of ideas related to the use of sidelink-based cellular infrastructure entities in V2X (Vehicle to Everything) communication, described in U.S. Pat. No. 11,350,388 B2 "WRSU INTEGRATION IN CELLULAR NETWORKS", are provided solutions for low latency communication over network infrastructure to be used both in automotive and automation applications.

Faster UE-to-UE communication for specific applications may be achieved by avoiding the Core Network involvement in traffic routing.

SUMMARY OF THE INVENTION

The disclosure is summarized by referring to the appended claims.

BRIEF DESCRIPTION OF THE DRAWINGS

For a more complete understanding of the present invention, reference is now made to the following detailed description taken in conjunction with the accompanying drawings.

The drawings do not represent an exhaustive representation of the possible embodiments of the invention and the invention is not limited to the arrangements presented in the drawings.

The drawings are:

Figure 1:
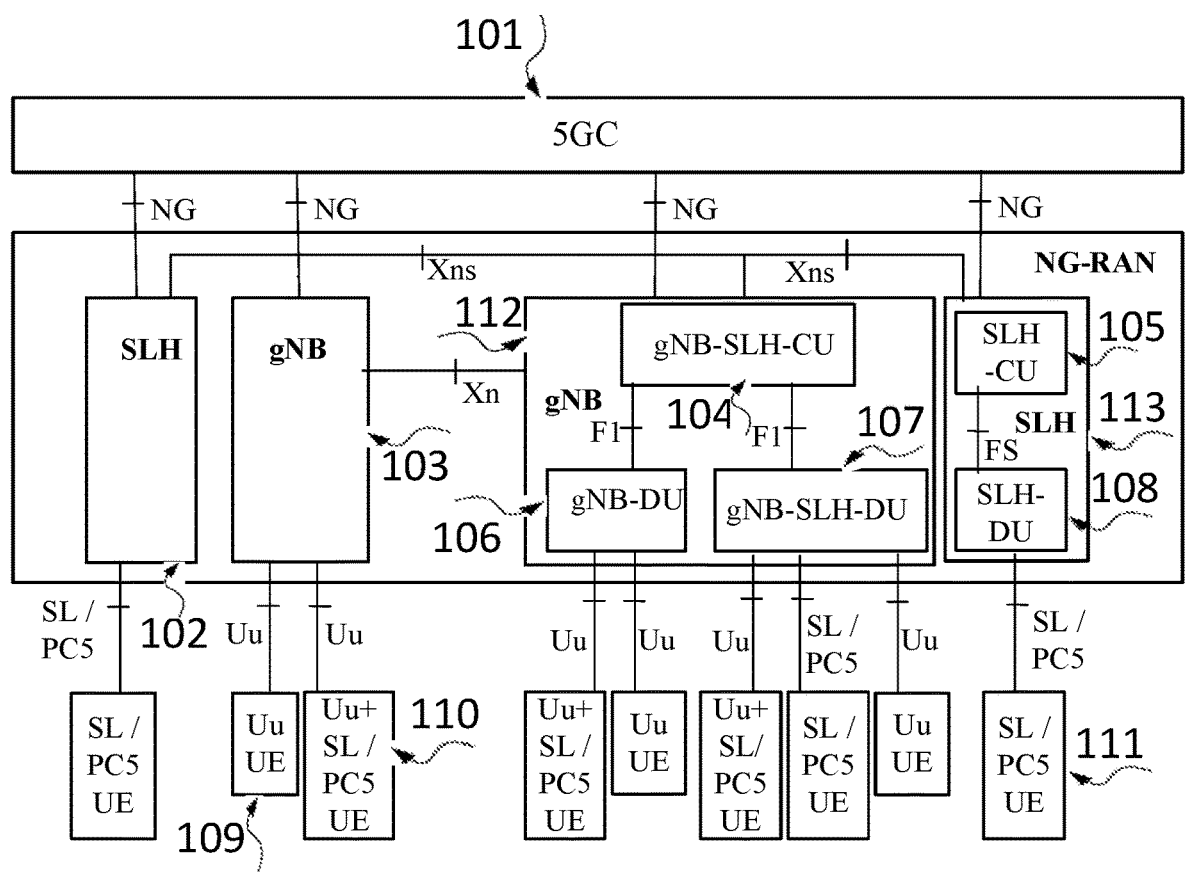
Figure 2:
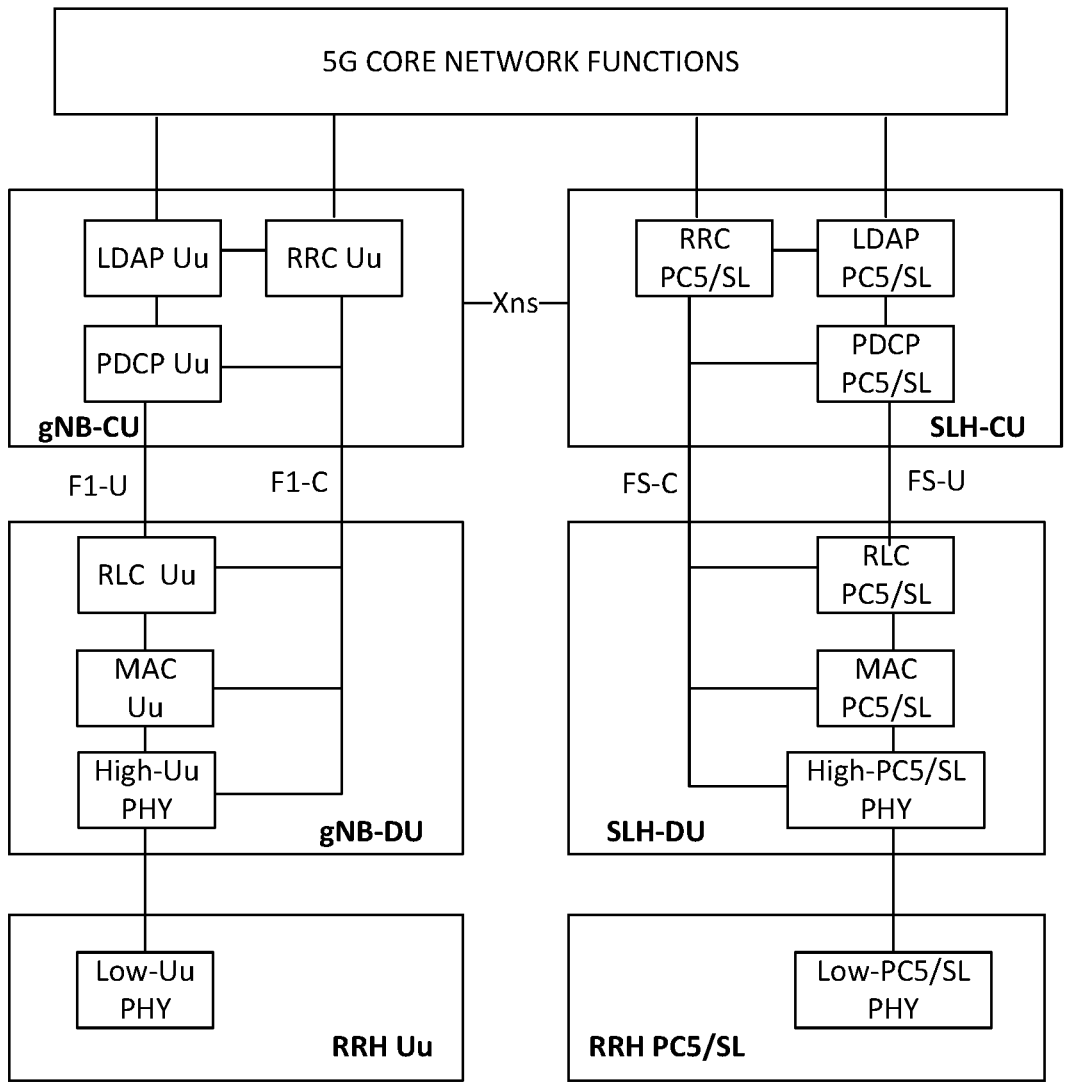
Figure 3:
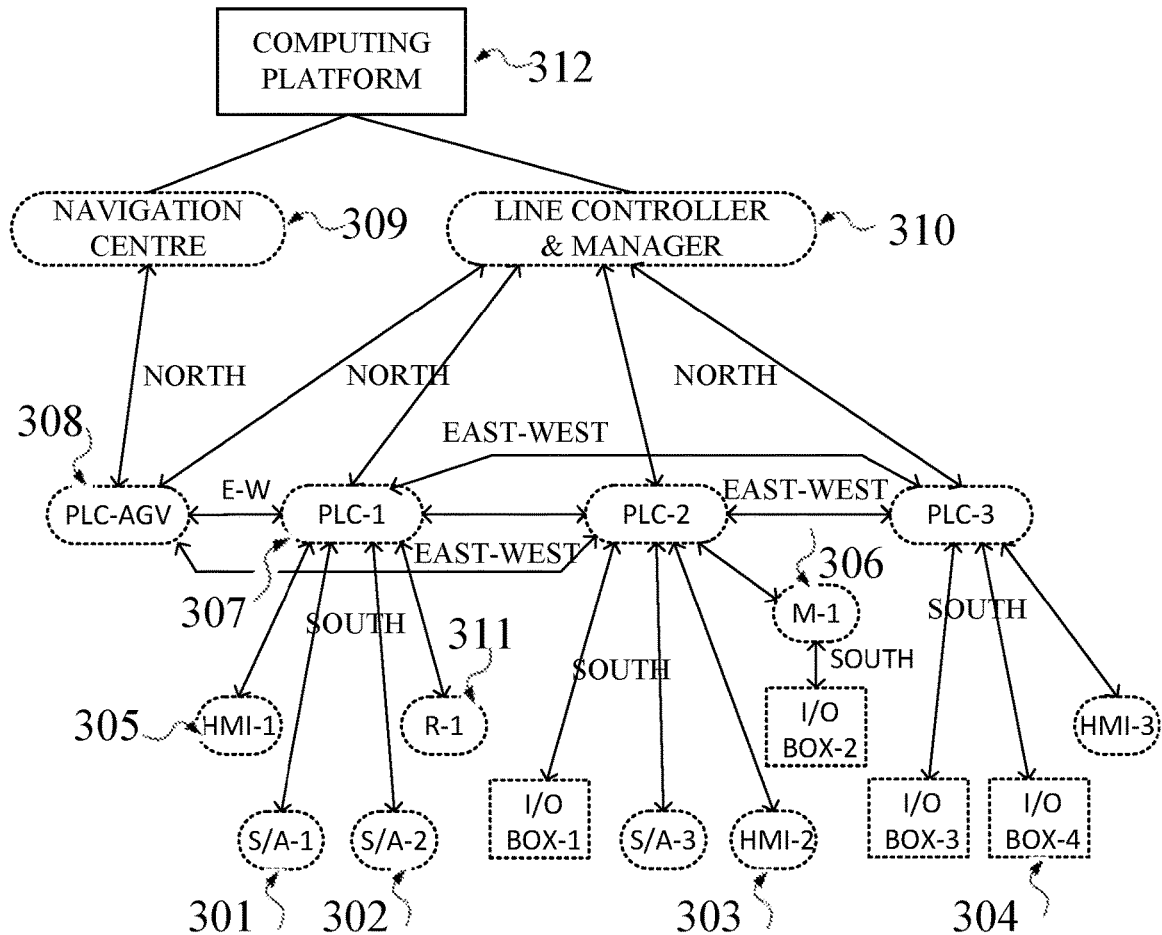
Figure 4:
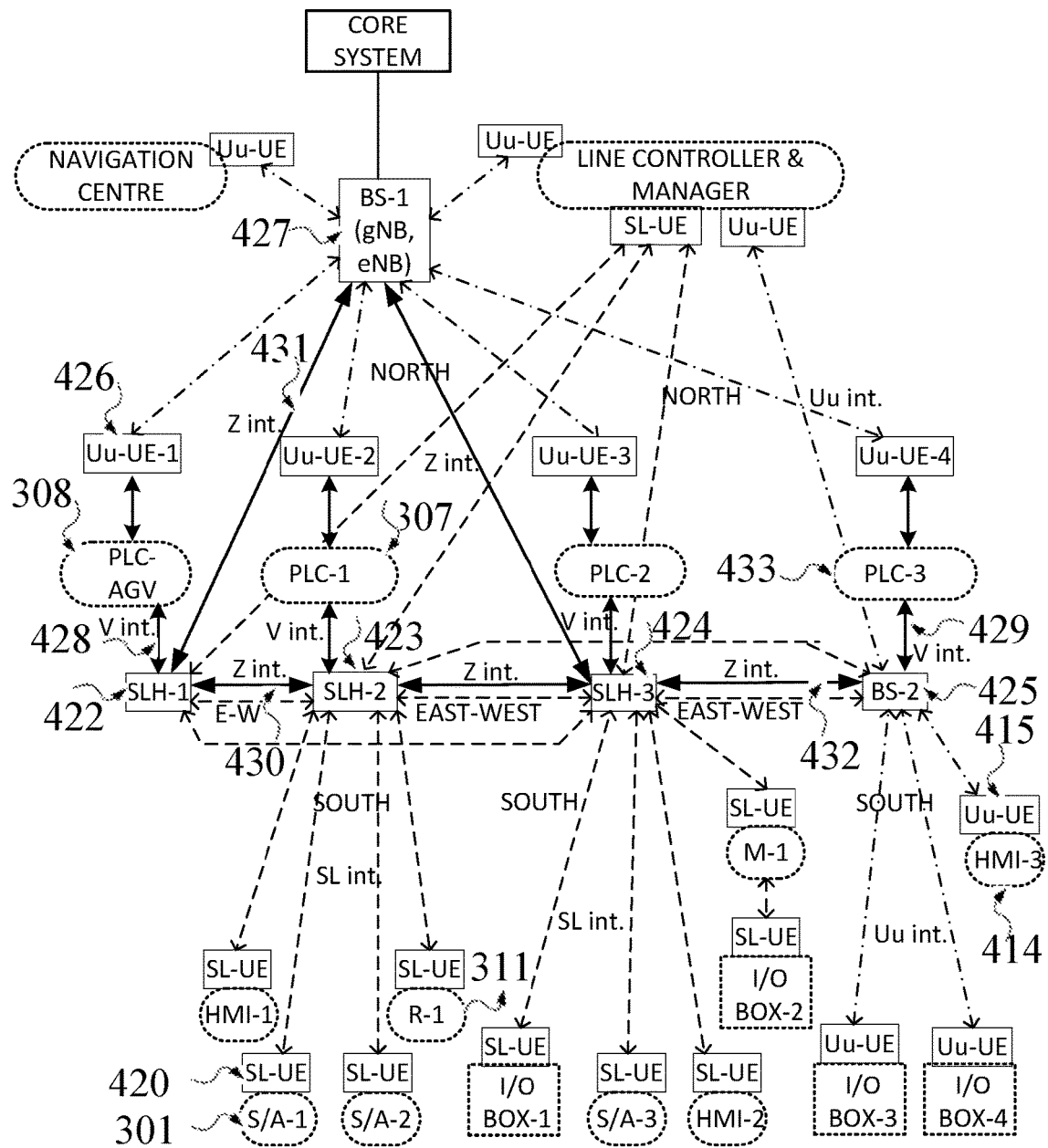
Figure 5:
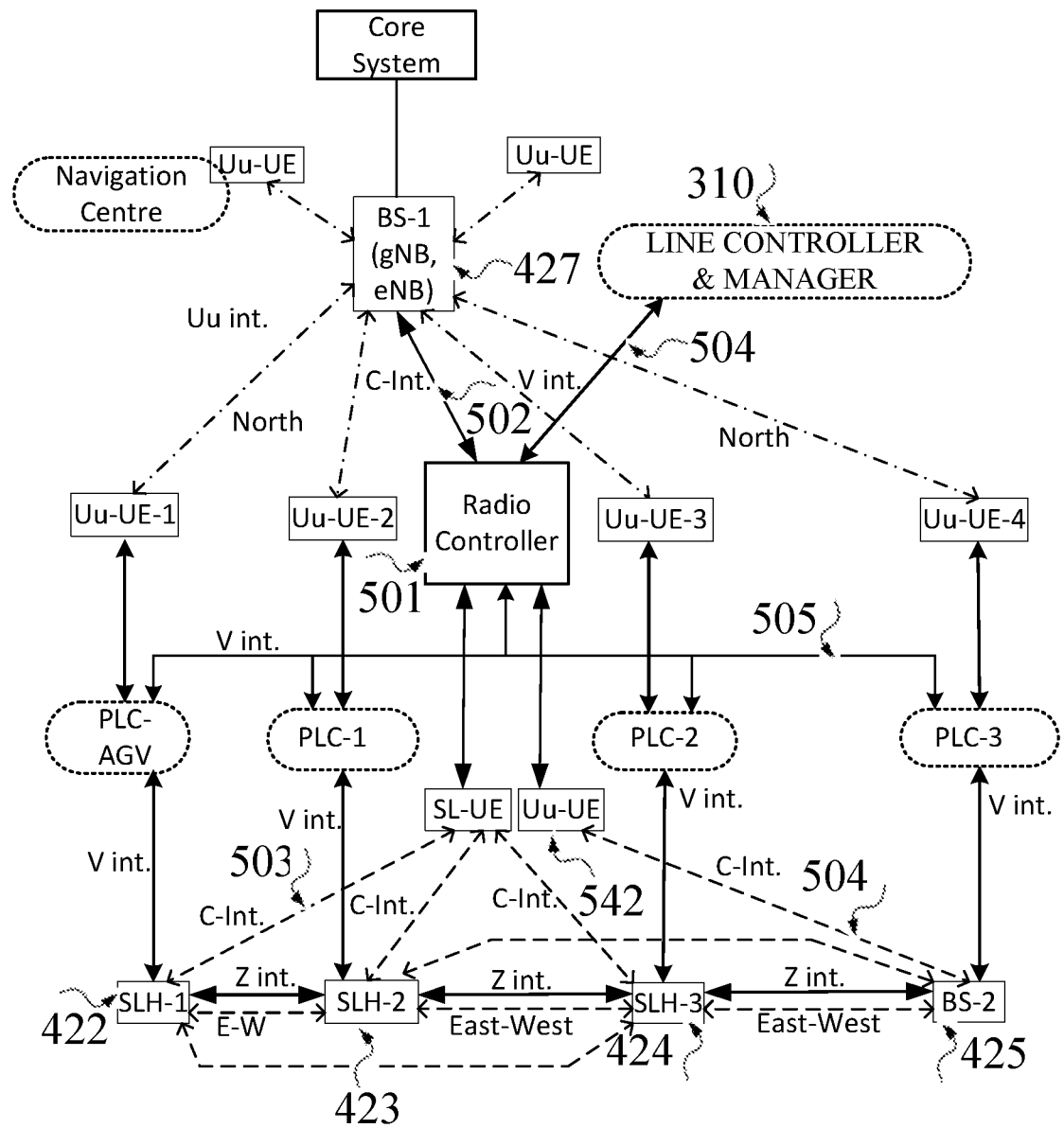
Figure 6:
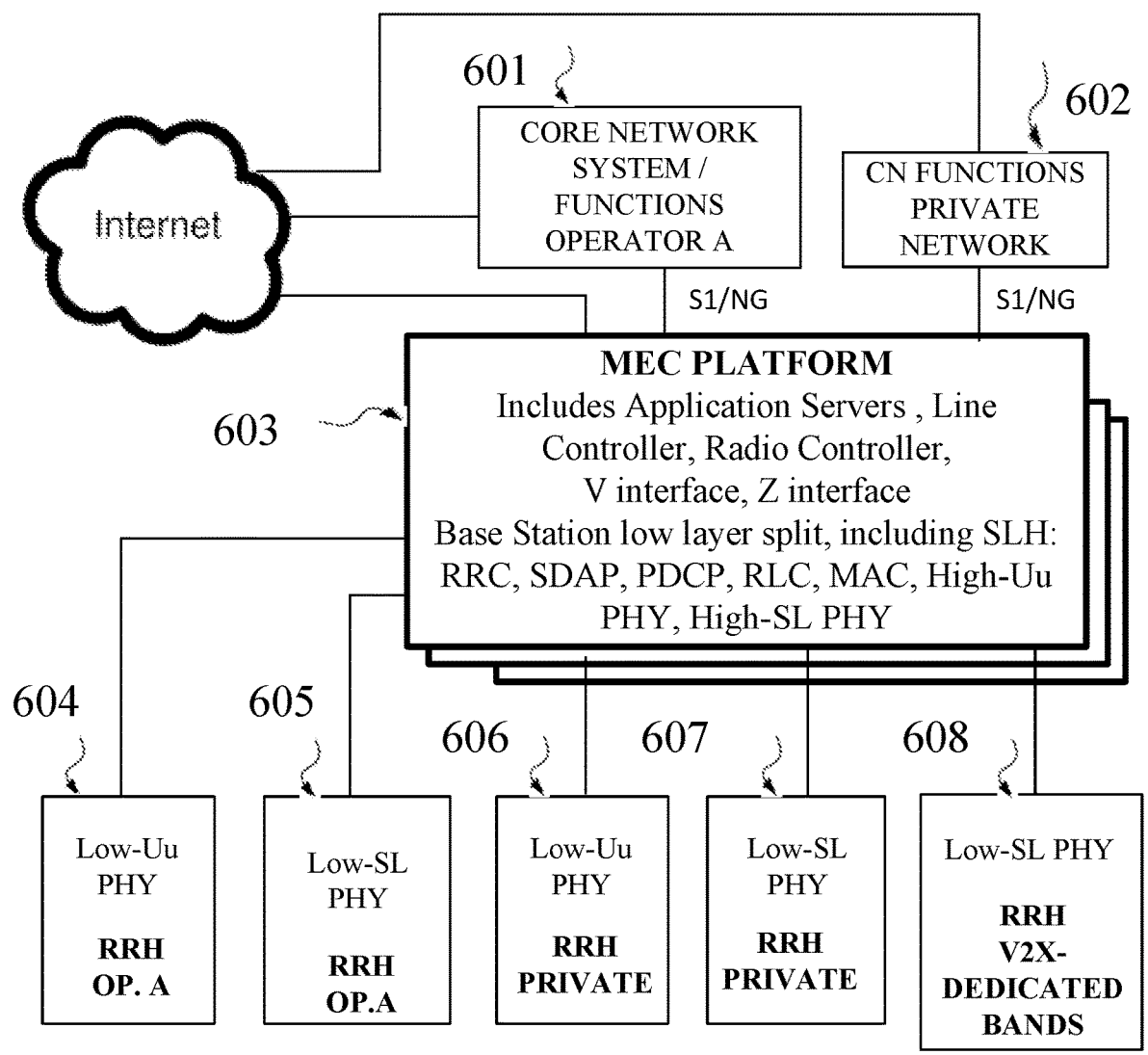
Figure 7:
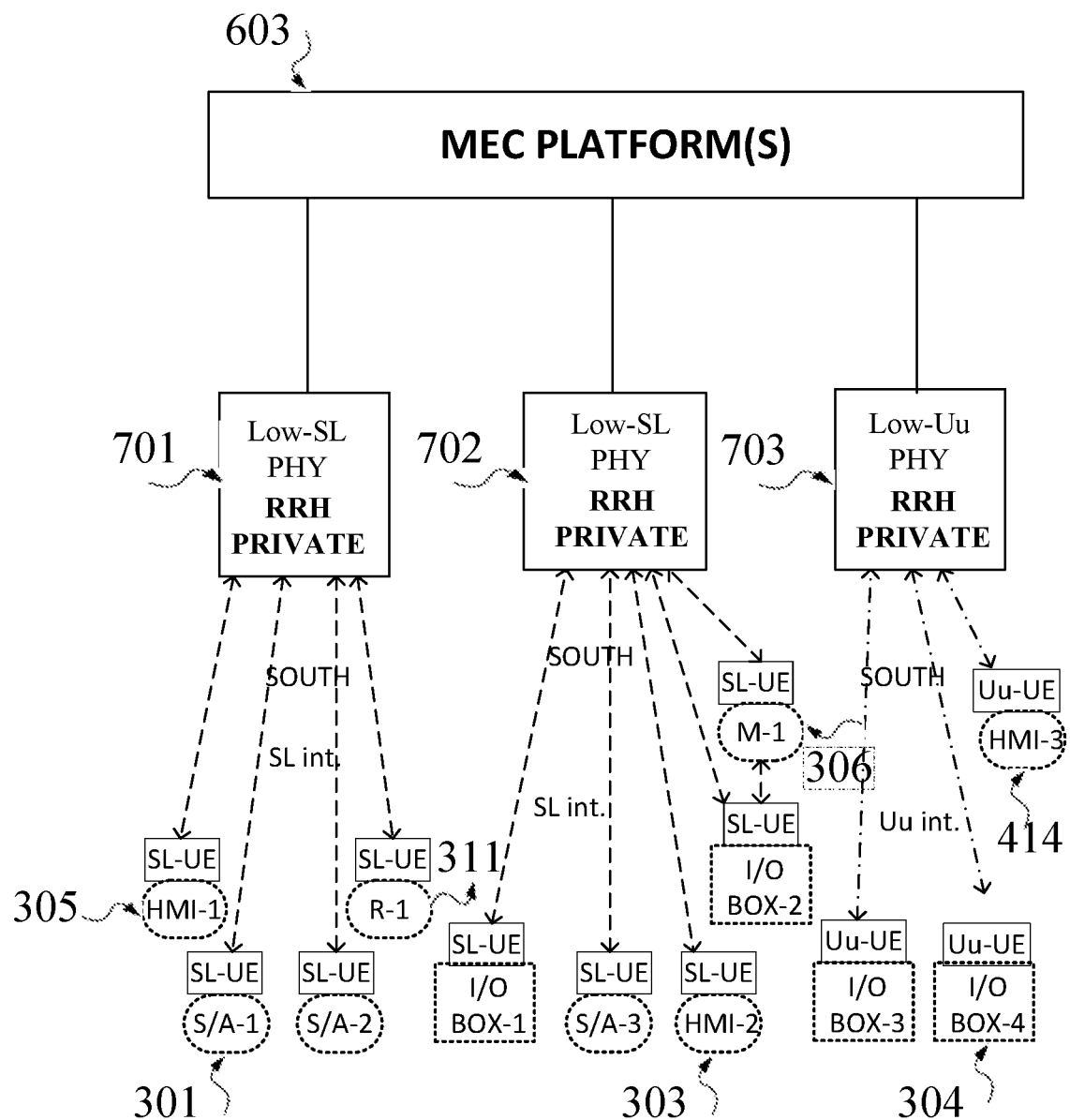
Figure 8:
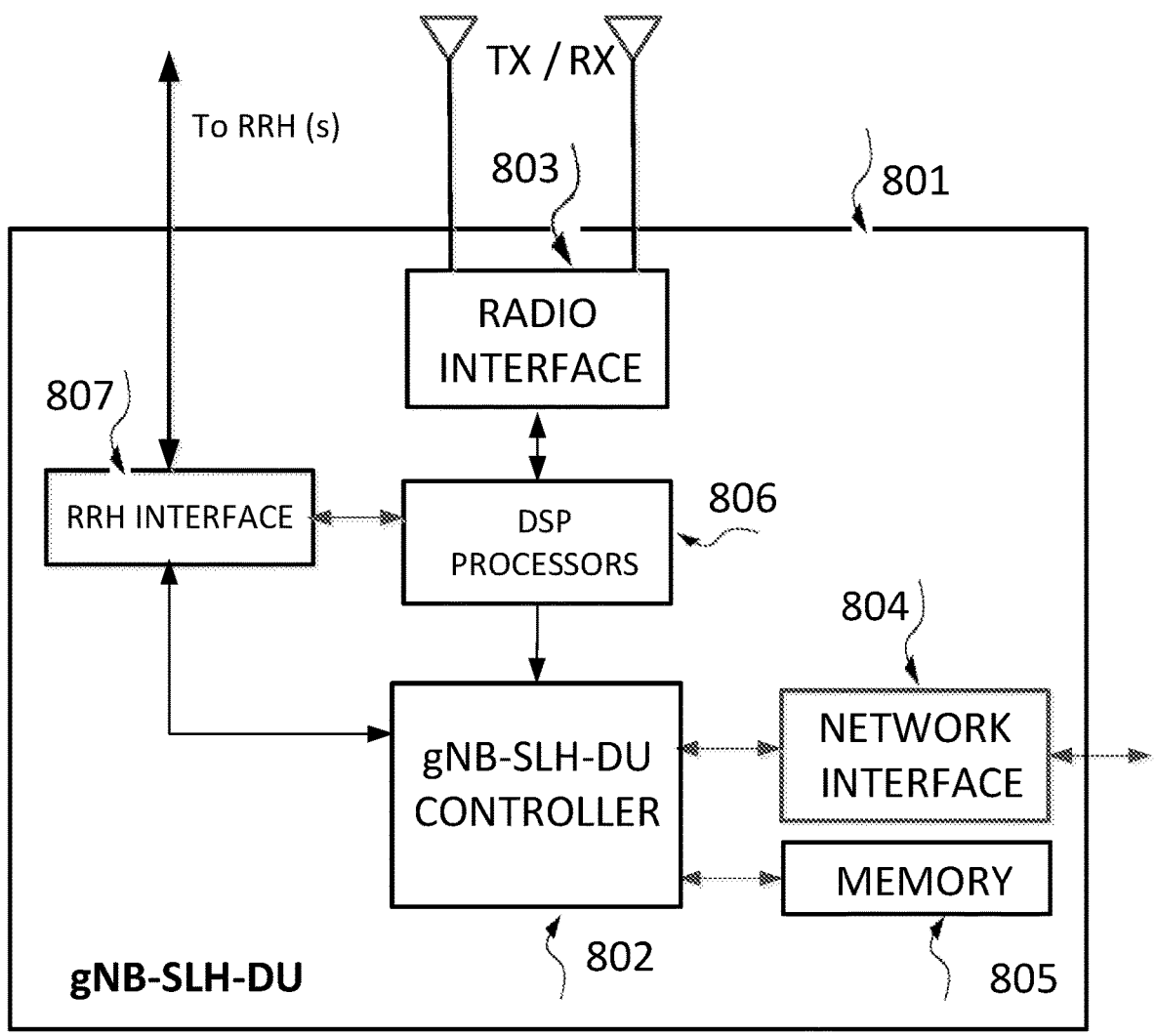
Figure 9:
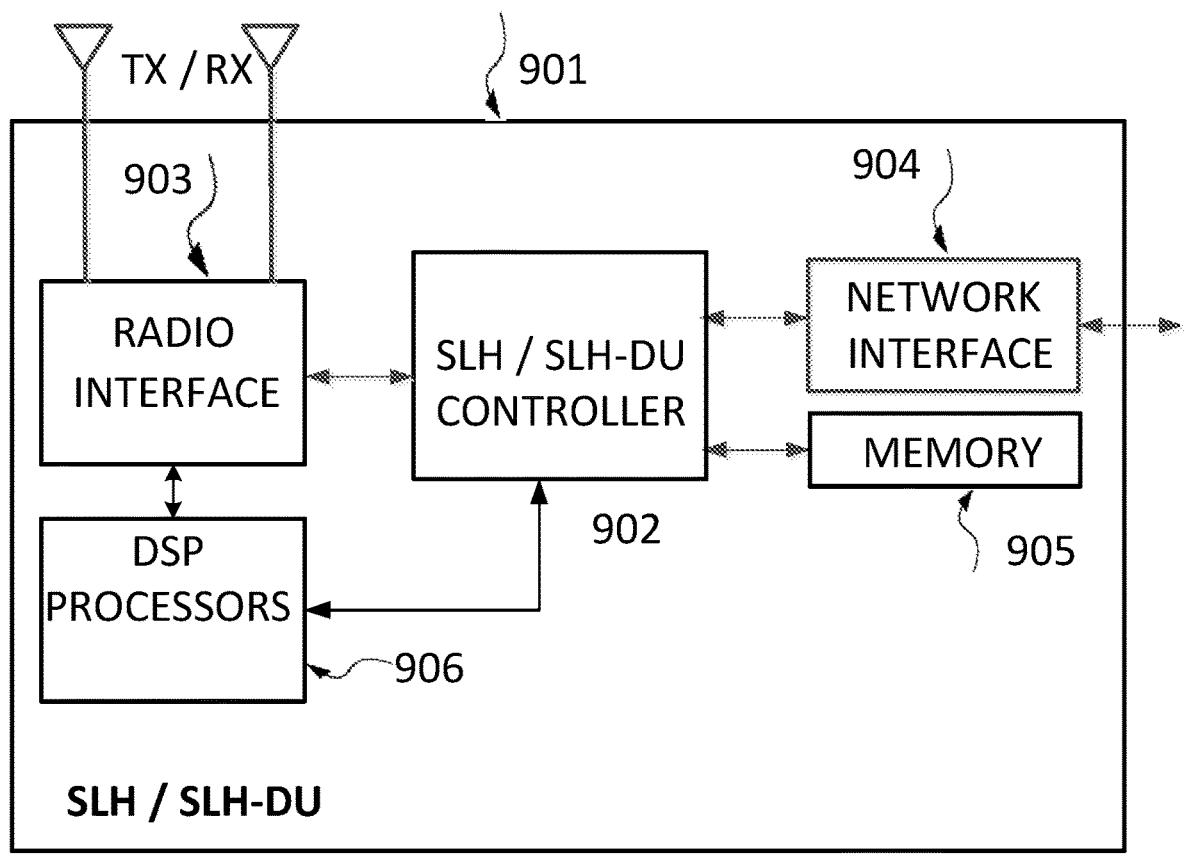
Figure 10:
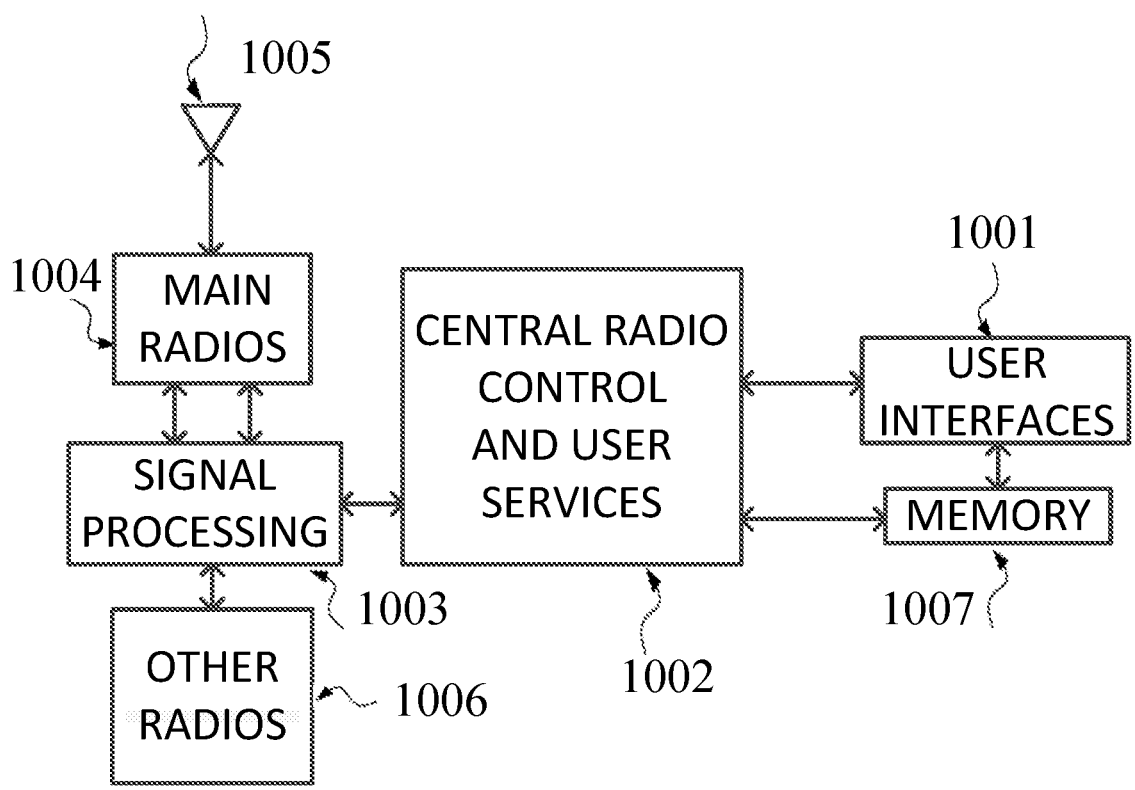
Figure 11:
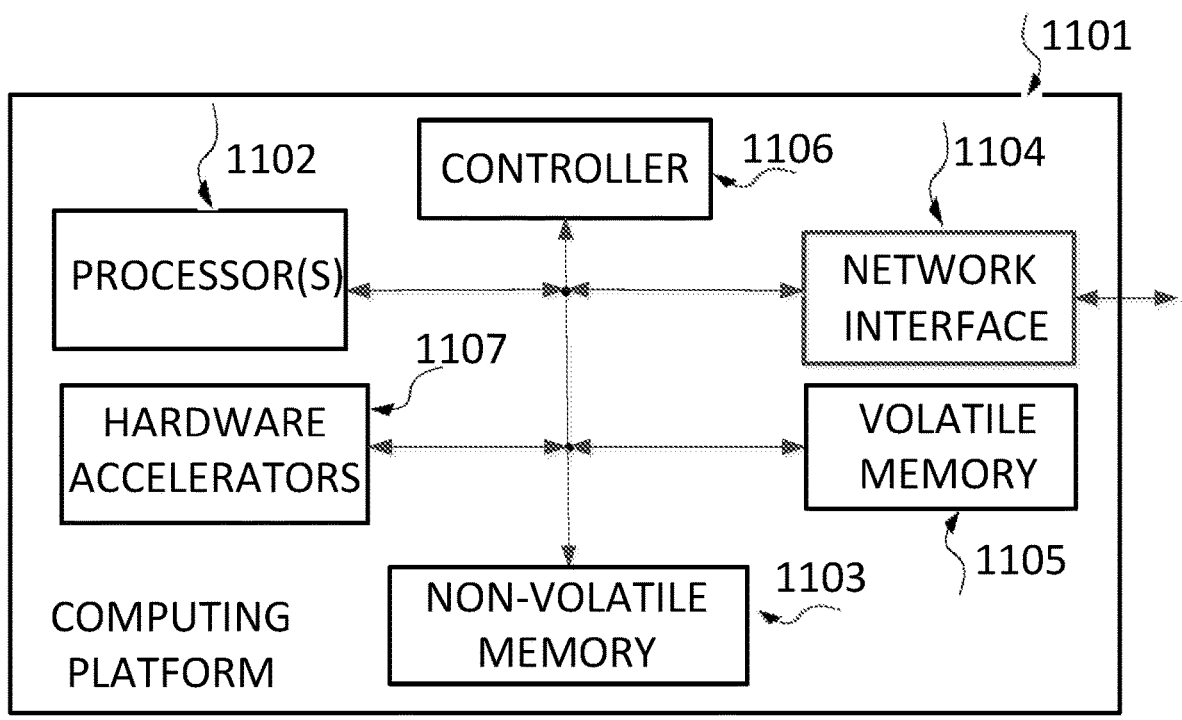

FIG. 1—Prior Art—Represents the architecture of a RAN (Radio Access Network) system including RAN Nodes supporting both Uu and SL/PC5 air interfaces;

FIG. 2—Prior Art—Represents the functional architecture of the RAN system from FIG. 1;

FIG. 3—Represents the operational architecture of a production facility;

FIG. 4—Represents a combined operational and radio system architecture in a production facility;

FIG. 5—Represents a system architecture including a Radio Controller;

FIG. 6—Represents a system architecture using edge computing in industrial and V2X applications;

FIG. 7—Represents a combined operational and radio system architecture in a production facility based on RAN Nodes supporting both Uu and SL/PC5 (Sidelink or device-to-device) air interfaces;

FIG. 8—Represents a gNB-SLH-DU (gNB-base station in 5G, SLH—Sidelink Hub, DU-Distributed Unit) block diagram;

FIG. 9—Represents an SLH block diagram;

FIG. 10—Represents a UE (User Equipment) block diagram;

FIG. 11—Represents a MEC (Mobile Edge Computing) platform.

DETAILED DESCRIPTION

In the following description, for the purposes of explanation, numerous specific details are set forth for providing a better understanding of the present invention by way of examples. It should be apparent, however, that the present invention may be practiced without these specific details.

The following description uses terminology familiar to those skilled in the art of wireless cellular networks and skilled in NR (New Radio aka 5G) technology. However, this fact should not be considered as restricting the applicability of the invention to these technologies, and the present invention also encompasses other similar technologies as well as evolving cellular technologies.

In this invention an SL Hub (SLH) has a high-layer functionality similar with the base station and use the SL radio interface for communication with an SL-UE or with another SLH. In some embodiments the direction from the SLH to the SL-UE is named downlink and the direction from the SL-UE to the SLH is named up-link.

PRIOR ART

The Road Side Unit (RSU) described in the US patent 11,350,388 B2 is in fact an SLH used in a V2X application.

As result, the RSU and SLH illustrate the same concept. As disclosed in the U.S. Pat. No. 11,350,388 B2 and reflected in FIG. 1-PRIOR ART, the SLH supporting SL/PC5 air interface may be connected to the Core Network (CN)-101, can be deployed as a self-contained unit-102 or can be split into an SLH-CU (Central Unit)-105 and an SLH-DU (Distributed Unit)-108, wherein the SLH-DU is connected to the SLH-CU through an F1 interface or through a new interface FS.

Two SLHs or an SLH and a base station may communicate through a X2/Xn logical interface or may use a new Xns interface.

The RAN Nodes or Radio Nodes may be, as shown in FIG. 1:

A. Base Station-103 (eNB in LTE or gNB in 5G) supporting only the Uu air interface or stand-alone SLH-102 supporting the SL/PC5 air interface;

B. Base station-112 supporting both Uu and SL/PC5 air interfaces, i.e., the SLH is included within the base station; in an embodiment this base station is split into a CU and one or more DUs.

C. SLH-113 supporting SL/PC5 air interface; in an embodiment this SLH is split into a CU and one or more DUs;

D. Central Unit (CU), gNB-CU, gNB-SLH-CU-104, SLH-CU-105, gNB-CU-UP (User Plane), gNB-CU-CP (Control Plane), SLH-CU-UP, SLH-CU-CP.

E. Distributed Unit (DU), gNB-DU-106, SLH-DU-108, gNB-SLH-DU-107.

F. RRH (Remote Radio Header) or Radio Unit (RU), as defined in eCPRI or in O-RAN Alliance standards.

G. Relay or IAB (Integrated Access and Backhaul) node.

A RAN Node may be software-defined, i.e. different RAN Nodes can operate on the same computing platform while using the embedded computing resources, signal processing and interfacing capabilities of the computing platform.

The CU of the base station can be further disintegrated in a CU-CP and multiple CU-UPs which are used for connecting an Edge Computing platform, as shown in FIG. 6 of the patent application U.S. Pat. No. 16,818,389.

The gNB-103 can serve over the Uu air interface the Uu-UE-109 and eventually the Uu-UE-10, which can provide, in addition to the Uu air interface, an SL/PC5 air interface for communication with supporting UEs.

The gNB-112 communicate over the air with UEs supporting Uu and SL/PC5 interfaces, in any possible combination.

The SLH-113 can communicate with the SL/PC5 UE-111.

In FIG. 2—PRIOR ART, are shown the functional layers of a split gNB and of a split SLH.

In an embodiment the PHY (Physical Layer) is split, as the gNB-DU or the SLH-DU includes the High-PHY processing of the Uu, respectively SL/PC5 air interfaces and the RRH units include the Low-PHY processing of the Uu, respectively SL/PC5 air interfaces.

Software-Defined Production Line

While analyzing the application-level structure of a production facility and the connection to (beyond) 5G nodes, it appears that different deployment architectures are possible.

In continuation it will be analyzed the needed functional flexibility in a factory production line, illustrated at the application level in FIG. 3.

FIG. 3 depicts a functional view of a typical production facility. As exemplification, but not incurring any limitation, a conveyor moves objects which are processed by robots through their actuators. Actuator is defined as any device causing an action, mechanical or electrical.

A device may be, but not limited to, a sensor or an actuator-301, a I/O (Input/Output) box-302 or gateway, an HMI (Human Machine Interface)-305, a machine-306, etc.

The PLC (Programmable Logic Controller)-307 is a machine, computer or application used in automation. The PLC may identify a specific entity by n bits included in its serial production number or in its embedded Layer-2 address (for example Ethernet address) or another identifier, including an SL Layer-2 address, where n is lower or equal with the number of bits belonging to the identifier.

At each relevant position of the conveyor, it is installed a PLC, also referred to as motion controller, which receives measurement data from field devices, like sensors, and provides controls to other field devices including actuators, drivers, pumps, robots-311, etc. The exchanged packets, at Layer 2, are short (60 bytes, including the Ethernet address) and are sent each 0.5 ms or 1 ms. A mobile device with an HMI can be also connected to the PLC.

An AGV (Automated Guided Vehicle)-308, moving with max. 15-20 km/h, can also be considered as PLC. The AGV is typically used in logistics, for carrying objects used by the production line.

The AGV can be connected to a Navigation Centre—309, to the Line Controller and Manager (LCM)-310 and to the PLCs collaborating on common operations.

The modern PLCs are deployed on a small computing platform (FIG. 10) containing:

A. Computing resources, such as at least one processor and erasable and non-erasable memory, for running the PLC-specific applications.

B. Connection and communication with field devices through standardized or vendor-specific communication interfaces and protocols.

A Virtualized PLC (vPLC) is implemented on a computing platform. The PLC is a software application running on this computer.

Field devices are sensors and the actuators, which can be stand-alone-301, -302, or included in I/O boxes-304.

Each PLC can be connected to a hand-held device acting as Human Machine Interface HMI-305.

In addition, a PLC can be connected to one or more machines or robots, executing specific jobs.

Some machines or robots may be connected to their specific sensors and actuators.

In an embodiment of this application several PLCs exchange between them-Control to Control (C2C)—the information acquired from specific sensors, and/or commands sent to actuators, and possibly other information. In specific applications the C2C information is sent every 1 ms. In this invention the resulting communication is named E-W (East-West) communication.

Each PLC may be connected to the Line Controller & Management (North communication). This traffic has less stringent latency requirements. The Line Controller can be implemented on a Computing Platform—312.

Similarity Between Automation and Automotive Applications

In automation there is a controller-PLC, which receives inputs from sensors and makes a decision on output commands to actuators.

In automotive applications, for example autonomous driving, a car controller receives inputs from sensors and other sources and makes a decision which is transmitted to the car's actuators.

In remote driving, the driving controller is remote, the sensors and the car's actuators are not collocated with the driving controller and wireless communication is needed.

In sensor fusion, the sensors are not collocated with the fusion controller, such that wireless communication is needed.

In sensor fusion, the fusion controller may not be collocated with the car's controllers.

In intersection's road safety or smart mobility, the sensors and the humans are not collocated with the intersection controller, the crossing humans are not collocated with the vehicles and traffic lights, such that wireless communication is needed between the controller and all the involved entities.

In conclusion, there is an architectural similarity between the communication architectures to be used in automation and automotive/smart mobility/road safety applications.

Communications

The productivity of an industrial production facility depends on the speed of the production line. The current requirements indicate transfer times as low as 0.5 ms on South direction and 1 ms on E-W direction.

The requirements for latencies in North direction are more relaxed, for example 10 ms.

Ten years reliability of the communication network (time between faults) is required. This means that a solution should include redundancy of communications.

Today the connection between production line entities is done mainly through Industrial Ethernet, but there are a lot of other standard or proprietary connections, especially on South direction (see FIG. 3).

In this invention the connectivity using the cellular technology coexists with connections based on other technologies.

In this document are considered two types of cellular technologies:

A. Base Station (BS) based solution, using the Uu interface between a base station and a UE (to be named Uu-UE).

B. Sidelink based solution, using the SL (also named PC5) interface between an SL Hub (SLH) and a UE (to be named SL-UE).

Base Station Based Solution

The LTE or NR (5G) existing solutions connect each entity on a factory floor to a Uu-UE, and the UE-to-UE communication is done through the Core Network (CN). A PLC will connect to a sensor or to an actuator through the UPF (User Plane Function) in the 5G CN or through the Service Gateway in LTE Core System.

When the network is public, i.e. belongs to a PLMN, the latency of UE-UE communication will be above 30 ms for NR/5G.

If the network is private, i.e. belongs to the factory, the latency of UE-UE communication will be above 10 ms for NR.

In an embodiment of this invention, presented in continuation, the UE-to-UE communication is executed by the base station without the involvement of the Core System in forwarding user data between UEs.

The communication through the base station is suitable for traffic with less stringent latency requirements, to traffic involving mobility, and for providing redundancy to the sidelink-based operation.

Inter-PLC Communication

A PLC can be directly connected to, or can embed, a Uu-UE, an SL-UE, an SLH, or both Uu-UE and SLH.

A PLC can communicate with entities, for example sensors, actuators, other PLCs, HMI, Robots, Machines, which can be directly connected to or can embed an SL-UE, an Uu-UE, an SLH. For assuring radio path redundancy or equipment redundancy, both Uu-UE and SLH, or both SL-UE and Uu-UE can be connected to a PLC or embedded into a PLC.

The SL (SideLink or PC5) interface, due to its much lower latency, is especially suitable to the South PLC communications, to East-West communications between PLCs and to connection of sensors which report to multiple PLCs.

The Uu interface which needs, based on the existing cellular system architecture, the Core System involvement for traffic forwarding from a Uu-UE connected to sensors/actuators to a PLC, is suitable for application connections when these connections have less stringent latency requirements.

The PLC can be connected on North directly to a MEC (Mobile Edge Computing) platform or to the Internet.

Sidelink communication is more attractive also when a sensor information is sent to multiple PLCs. In this case is needed a single transmission from the sensor to all the connected SLHs (group-cast in sidelink), while when communicating through a base station are needed several transmissions: one from the sensor (connected to an Uu-UE) to the base station, one from the BS to the Core System, one from the Core System to the target BS connecting the target PLC and one from the target base station to another UE, connected to the target PLC.

FIG. 4 Description

In FIG. 4 is described a radio system architecture, using both the Uu air interface and the and the Sidelink technology.

In FIG. 4 an SLH or a small Base Station (BS) is co-located with each PLC and an SL-UE or a Uu-UE is co-located with each sensor, actuator, I/O box, machine, robot, HMI, etc.

The term "collocated" means embedded or situated in each-other proximity.

A Base Station or an SLH may be deployed while using a split into a Central Unit (CU) and a Distributed Unit (DU), such that the collocation with a BS or SLH means colocation with their CU or DU.

The PLC-1 (307) and PLC-AVG (308) are connected in the North direction to the base station BS-1 (427). PLC-AVG (308) is connected to BS-1 (427) through Uu-UE (426).

Each PLC is connected to an SL Hub, for example PLC-AGV (308) is connected to SLH-1 (422) and PLC-1 (307) is connected to SLH-2 (423).

A PLC is connected to sensors and actuators through an SLH or a BS, i.e., each sensor or actuator is connected to a respective SL-UE or Uu-UE, which in turn is connected to the SLH through an SL interface or to respectively the BS through the Uu interface.

In an embodiment of this invention S/A1 (301) connects to SL-UE (420) which connects to SLH-2 (423) which connects to PLC-1 (307) and to R1 (311) through an SL-UE.

An HMI could be connected to the SLH directly through an SL interface or through a base station, using the Uu interface, or through both SL and Uu interfaces.

HMI-3 (414) connects through Uu-UE (415) and BS-2 (425) to PLC-3 (433).

In this invention is defined a logical Z Interface at the application level, Z int. in FIG. 4, which allows the communication between a (v)SLH, where (v) indicates optional virtualization on a computing platform, and another (v)SLH or between a (v)SLH and a (v) BS. In an embodiment of this invention Z interface-430 connects between SLH-1 (422) and SLH-2 (423), Z interface-431 connects between BS-1 (427) and SLH-1 (422) and Z interface-432 connects between BS-2 (425) and SLH-3 (424).

In practice, the messages of the Z Interface can be included in the X2 or Xn or Xns interfaces; in this invention is used, in some embodiments, the X2/Xn/Xns naming instead of Z Interface.

In this invention is defined a logical Vertical Interface, V int. in FIG. 4, which allows the communication between the application running on a PLC and the connected RAN Node, either SLH or base station.

In an embodiment of this invention Vint (428) is deployed between SLH-1 (422) and PLC-AVG (308) while V-int (429) is deployed between PLC-3 (433) and BS-2 (425). V interface could use the Z interface User Plane for transporting data belonging to the application layer.

In another embodiment, a BS communicate with a PLC over a wired interface transporting Z interface/X2/Xn/Xns messages.

In another embodiment of this invention one PLC can transmit user data to other PLCs while using an embedded SL-UE for transmitting SL unicast or group-cast communication over the air.

In yet another embodiment of this invention one SLH can communicate with other SLHs while using X2/Xn/Xns communication over SL interface.

In each architecture there may be a specific radio slot or mini-slot allocation for each communication link.

PLC to/from Line Controller & Manager North Communication

The PLC to/from Line Controller & Manager communication is a North communication, currently used mainly for software maintenance and PLC configurations.

Not having stringent real time requirements, the North communication can be done through the Base Station. Each PLC and the Line Controller & Manager will be connected through an Uu-UE to the base station.

Alternatively, the Line Controller & Manager can be connected to an SLH, which serves as hub for the connection of all other SLHs, each one being connected to a PLC (FIG. 4).

The Line Controller & Manager can also form groupcast groups, including PLCs and/or devices, for receiving communication from a device or from a PLC.

In an embodiment of the current invention, the SL system can be used as redundancy option to the base station system and vice versa.

The redundant system can operate in two modes:

A. Start operation when a failure of the default system is detected by the PLC.

B. Both systems are simultaneously operational. In this case the PLC and the Line Controller & Manager will have either to drop the redundant messages or to ignore them.

In case A, the PLC sends over the V Interface a message to the redundant system asking to activate it. When the default system becomes operational, the PLC sends over the V interface a message to cancel the operation of the redundant system.

PLC to/from Sensors/Actuators/Drivers/Machines/HMI South Communication

The fastest communication on the South interface uses the SL air interface. Each PLC is connected to a (v)SLH and each Sensor or Actuator or Driver or Machine is connected to an embedded or external SL-UE, as shown in FIG. 4.

An HMI can connect to a PLC either using the SL Interface option or the base station Uu interface option or both, for redundant operation.

Most of the messages on this interface are very short and may be sent every 1 ms or even less.

In order to reduce the interference, the TDD operation on the South and North SL interfaces shall be synchronized with the same time reference and coordinated, such that all (v)SLHs will transmit in the same time and also receive information from the connected devices in the same time.

A message over the SL interface should either be sent two or three times or use HARQ for improving the chances of reception.

The South, North or E-W communication between SLH and the relevant entities can use a 0.25 ms slot or a part of it in case that is applied an SCS (Sub-Carrier Spacing) of 60 GHz.

The network formed by an SLH and the connected SL-UEs is named here "SLH group".

There are two issues at the physical layer:

A. Due to the metal objects and machines on the factory floors, the reflected waves can cover the floor, far beyond of the area of interest. The solution for avoiding interference is the allocation, during a transmission time interval, of orthogonal frequency resources for transmission and the usage of a suitable gap interval between the PHY symbols.

B. The transmitters on the E-W direction will interfere with the receivers of South and North directions. It is needed to allocate enough time intervals for E-W directions for avoiding interference on this direction and for avoiding interference with North and South directions.

For easing the radio coexistence problems, the base station BS-1 and the SLH should operate on different frequency bands.

Sensor to Multiple PLCs Group Communication

A device, for example a sensor, can be connected to several PLCs while using groupcast over the SL interface. For implementing the groupcast, it is needed an Application Server which will form the communicating group and will transmit to the device and to each PLC, the groupcast address or name at application level.

The application server can reside within the Line Controller & Manager.

In a second step, the SL-UE connected to the device (source) and each SLH connected to a PLC in the group will receive, from the hosting device (SL-UE) respectively the connected PLC, over the Vertical Interface, the identifier of the specific group.

Each device and each PLC in the group will assign to itself an SL/PC5 Layer 2 address specific to this group and will derive the Layer-2 address to be used on the SL/PC5 interface as destination for this groupcast.

In a third step, the device or the PLC sends one or more messages over the SL/PC5 interface while using its own layer-2 address as source address and the layer-2 groupcast address as destination address.

The target (v)SLH can use HARQ for providing feedback regarding the reception. The HARQ feedback will have as source address the (v)SLH address pertinent to this groupcast and as destination the layer-2 address of the SL-UE, also pertinent to this groupcast.

Alternatively, the Application Server will transmit to the device the identity, at application level, of the other devices and/or PLCs forming the groupcast group.

The SL-UE connected to the device, or the SLH connected to PLC will broadcast over the SL interface a message including its own identity at application layer and the involved PLCs identity at the application layer and will ask each SL-UE or PLC to provide the application-related Layer-2 address of each SL-UE connected to the other device or PLC in the group, while the first device is using a Layer-2 address assigned to the application.

In response, the application layer on each identified device will respond to the query and will instruct the connected SL-UE, over a local V-interface, to send the response while using a source Layer-2 address corresponding to the specific application identifier.

In the next phase, the first device will transmit an application layer message including the layer 2 groupcast address to each device or PLC in the group, while using the Layer-2 address of each SL-UE or SLH connected to a device or PLC in the group.

Finally, the application layer of the first device will transmit to all other devices and/or PLC a message, through their connected SL-UEs, while using the groupcast Layer-2 address for connecting to those SL-UEs.

PLC to/from PLC Communication

The PLC-to-PLC communication is needed for synchronizing the operation of PLCs on a production line. Typically, four or five PLCs can communicate one to each other, creating same level (East-West) communications.

The preferred wireless mode of communication in this invention is through direct connections over the SL interface. Even when the PLC is virtualized, all the logical interfaces used in the following description are still implemented.

Each PLC is connected to an SLH, which also serves the South and North communications, which are synchronized and coordinated, such that all SLHs may have overlapping T (transmit) intervals and in addition overlapping R (Receive) time intervals.

The E-W (East-West) transmissions will interfere the S-N (South-North) transmissions. For example, if SLH-1 transmits to SLH-2 during a T interval of the S-N communications, SLH-2 reception of the message will be interfered by its own transmissions on the S-N directions.

The communication of SLH-2 to SLH-3 will also need a time separation.

For managing the time intervals allocation on S-N axis and on E-W axis is needed an additional Radio Controller or Management Entity, having between functions the allocation of these time intervals within the used frequency channels.

An SLH or a part of it can be virtualized. Even when the SLH is virtualized, all the logical interfaces used in this invention description are still implemented.

Unicast Between Two PLCs or Between a PLC and a Device

The Line Controller and Manager shall configure each PLC with the identity of the other PLC or device with which will communicate in unicast mode.

In turn, each PLC will communicate on the V-Interface with the directly connected SLH and will transmit the request to communicate with the identified PLC or device.

The message sent over V-interface shall identify the source device identity, at application level, and the destination device identity, also at application level.

The source device or PLC will send a broadcast message, asking WHERE IS the destination PLC or the destination device for unicast communication within the specific application.

In response, the destination device or PLC will send, through the connected SL-UE or respectively through the connected SLH, a message having as source Layer-2 address the address of the connected SL-UE or of the connected SLH address for each specific unicast transmission.

Alternatively, it can be used the same Layer-2 address for different unicast connections, while each connection is identified inside the unicast message.

Groupcast Between PLCs and Devices

The Line Controller and Manager will configure each device or PLC in a specific group with the identity, at application level, of the PLCs and devices with which will communicate in groupcast mode and with the groupcast identity at application level.

Each device or PLC will transmit to the connected SL-UE or SLH, over the V-interface, the groupcast identity at application level.

Each connected SL-UE and each SLH will derive, from the groupcast identity at application level, the destination Layer-2 address for this groupcast communication.

The equation for deriving the destination Layer-2 address for groupcast will be defined as part of the V-Interface application standard.

The source Layer-2 address in group communication will be self-allocated by the transmitting device; a specific Layer-2 address could be used for a specific groupcast identity.

Radio Controller

An example of the radio system architecture using the Radio Controller is depicted in FIG. 5.

In an embodiment of this invention there is, on application side, a logical Vertical Interface-505 between the Radio Controller-501 and each PLC and/or a logical Vertical Interface-504 between the Radio Controller-501 and the Line Controller & Manager-310.

The role of these Vertical Interfaces is to allow the interaction between the Radio Controller and the application level; in practice, the RAN nodes may relay some messages received over the V Interface on a Control Interface (C-Interface).

The Radio Controller-501 may communicate with each SLH (422, 423, 424) and BS (427, 425) over a C Interface (502, 503, 504), either through wired connections or using an SL-UE (541) respectively a Uu-UE (542) for transport.

Alternatively, the Radio Controller can be connected directly to a PLC, for example through the Vertical Interface-505.

The Radio Controller is used mainly for dynamically configuring and allocating radio resources to the RAN Nodes, such to enforce the latency, the throughput and the reliability required by each relevant application.

The RAN nodes connected to the Radio Controller will schedule the transmissions over the Uu and SL/PC5 air interfaces such to comply with the resource allocation received from the Radio Controller.

The Radio Controller can decide to enter some UEs or RRHs, when these UEs are not involved in data reception or transmission, in inactive mode or sleeping mode.

The Radio Controller is implemented on a computing platform, for example an Edge Computer or an Industrial Computer (see FIG. 6), and uses the processor, memory and network interfaces of the computing platform or of the edge computer.

The Radio Controller can also be a part of a Base Station or SLH, and implemented as part of their Control Plane.

Each communication on each S, N, E, W direction is part of a PDU session, characterized for bursty transmissions by its maximum bit rate and associated QoS or, in case of repetitive transmissions, the packet size, the transmission interval and the associated QoS.

In case that a PLC or a BS has a mix of repetitive and bursty communications, it is advisable to separate them into different PDU sessions.

The Radio Controller receives either over its V-Interface or over its C-Interface, for each PDU session to be set-up or to be modified, the list of parameters associated with the PDU session.

The Radio Controller combines the received information and analyses all the received elements and assigns through messages over the C-Interface time-frequency, modulation and coding, power, space resources for each North, South, East, West and SLH to SLH or SLH to BS communication.

In case that the base stations and the sidelink communication (SLH and SL-UEs) use the same frequency band or the same frequency channel, the Radio Controller will establish the radio resources which are used by base stations and Uu-UEs and the radio resources which are used by SLHs and SL-UEs.

The assignment of time-frequency resources includes:

A. Sub Carrier Spacing (SCS), at symbol, slot, or subframe level.

B. Slot format for each assigned slot, including Tx (transmit symbols), Rx (receive) symbols, HARQ feedback symbols C. Per RAN Node, assignment of the PDU sessions to a specific slot; for example, certain slots can be assigned to South communication, other slots or overlapping slots could be assigned to East-West communication.

D. HARQ mode.

E. Allocated PRBs per RAN Nodes for each slot.

F. Maximum latency per PDF session.

G. Specific transmission times, indicating the allowable time limit for transmissions belonging to a PDU session.

For repetitive data transmission the resource allocation should be semi-persistent, for allowing semi-persistent scheduling (SPS).

Dual RAT with Path Diversity

As it can be observed from FIG. 3, a PLC can communicate with another PLC either directly, using the sidelink RAT, or via a base station, using a Uu RAT.

The dual RAT communications can be also extended on South communication, i.e. a sensor, actuator, etc. can be connected to a Uu-UE and to an SL-UE for communicating with a PLC through a base station and/or through an SLH.

In addition, the two communication paths may use different frequencies, for example under 10 GHz for base station and mm waves for sidelink.

The radio path and radio frequencies used for Uu and SL may be affected differently by interference.

In an embodiment of this invention, same data is transmitted to a PLC or from a PLC by using a UE connected through the Uu Interface and the same UE or another UE connected through SL interface; it is the responsibility of the receiving end to drop the duplicate packets.

Dynamic RAN Resource Coordination

In case that the radio resources are shared between the base station system and the sidelink system, but no Radio Controller is defined, the sidelink system is considered preemptive over the base station system, having lower acceptable latencies. Only the North activity may be an exception.

Each SLH will first decide on the time resource allocation for transmissions and receptions on the South direction and will share its allocation with other SLHs.

All the SLHs will agree on the allocation of time-frequency resource allocations for the South direction such to avoid interference to receivers belonging to themselves and to the connected SL-UEs.

Secondly or in parallel, all SLHs will agree on time resource allocations on the Est-West direction, such to avoid interference to receivers belonging to themselves and to the connected SL-UEs.

After that comes the resource allocation for North direction; in some cases the same time resource as selected for the South direction could be used for the North direction.

The messages on X2/Xn/Xns interface will include:

A. SIDELINK RESOURCE COORDINATION REQUEST, used by an SLH to ask the resource allocation of each other SLH in vicinity, using a list of cells identified by CGI-Cell Global Identity;

B. SIDELINK RESOURCE COORDINATION RESPONSE, in which each SLH will indicate its resource allocation per cell:

B1. For each cell, its GCI (Global Cell Identifier);

B2. For each cell, the parameters related to time allocations, for each direction (S, E, W, N) and slot used in that direction, separately for user data, Physical Control Channels and Reference Channels:

a. SCS per symbol or per slot b. Allocated use for each symbol in the slot, relative to the reporting SLH: Tx, Rx, flexible c. Tx power d. Slot mainly use, if data: stringent latency, stringent reliability, both e. A number or qualifier indicating the importance of keeping the existing allocation.

C. SIDELINK RESOURCE COORDINATION PROPOSAL, in which the initiating SLH will propose to the responding SLH a new allocation of resources in specified cells.

D. SIDELINK RESOURCE COORDINATION PROPOSAL RESPONSE, sent by the SLH, where per specified cell will include approval, rejection and a cause for rejection, or a new proposal of allocation of resources.

After all the resources for the SL systems are decided, this selection can be communicated, for coordination, through a message on the X2/Xn/Xns interface to the relevant base station sharing the same spectrum.

Alternatively, a base station can request each SLH to report its resource allocation.

The messages on X2/Xn/Xns interface will include:

A. RAN RESOURCE COORDINATION REQUEST, used by a base station to ask information regarding the resource allocation of an SLH in vicinity, on a list of cells identified by their CGI;

B. RAN RESOURCE COORDINATION RESPONSE, in which each SLH will indicate its resource allocation per cell:

B1. For each cell, its GCI (Global Cell Identifier);

B2. For each cell, the parameters related to time allocations, for each direction (S, E, W, N) and slot used in that direction, separately for user data, Physical Control Channels and Reference Channels:

a. SCS per symbol or per slot b. Allocated use for each symbol in the slot, relative to the reporting SLH: Tx, Rx, flexible c. Tx power d. B4. Slot mainly use, if data: stringent latency, stringent reliability, both C. RAN RESOURCE COORDINATION PROPOSAL, in which the initiating base station will propose to the responding SLH a new allocation of resources in specified cells.

D. SIDELINK RESOURCE COORDINATION PROPOSAL RESPONSE, sent by the SLH, where per specified cell will include approval, rejection and a cause for rejection, or a new proposal of allocation of resources.

Base Station or SL Hub Local Forwarding

As resulting from the previous discussion, in case that one of two entities with stringent latency requirements is connected to a Uu-UE or is impossible to establish a sidelink connection between these entities while using two SL-UEs, it is needed a new approach to the cellular system operation such to satisfy the factory latency requirements for the communication between them.

In an embodiment of this invention one or more base stations or SLHs forward traffic between UEs without using the services of the Core System.

UE Authentication

A first step of the cellular protocol is the authentication of the Uu-UE by the Core System, based on the unique identity of the UE. In the cellular system the MME (Mobility Management Entity) in LTE or the AMF (Access Management Function) in 5G allocate an identifier to the UE, which will be used for the further communication between the MME/AMF and the BS for referencing to this specific UE.

Based on the existing sidelink architecture in 3GPP TS 23.287 V16.3.0 (2020-07), the SL-UE does not exist independently, because the sidelink operation is a functionality included into a Uu-UE, such that no specific authentication is needed for SL-UE.

In an embodiment of this invention, the standalone SL-UE authentication is done by an application running on a computing platform; this application can use a serial product number, an Ethernet address belonging to the SL-UE or other identities.

In another embodiment, a stand-alone SL-UE including a SIM or IMSI or an electronic form of cellular identifier is authenticated by the cellular system. In such a case, the SL-UE will communicate with the MME or AMF through an SLH which is connected to the Core System through either S1 (BS to MME in LTE) or NG (BS to AMF in 5G/NR) interface.

UE and Application Identifiers

The Uu-UE or the SL-UE (embodiment of this invention) sends an initial message, requesting approval for operation (registration), to the Core System (CS) or to the application executing the authentication, through a base station or through the SLH.

In response, the MME in LTE or AMF in 5G or the application executing the authentication sends an approval message, including an Uu-UE or SL-UE identifier to be used by the BS or by the SLH in the communication with the MME, respectively with the AMF or the application executing the authentication.

In an embodiment of this invention this identifier can be used as a more general UE identifier.

The 5G base station assigns a RAN UE NGAP ID to address the UE context on the gNB RAN Node, including the security information, capabilities, access restrictions, etc.

The identifier for addressing the UE context within a base station or SLH is named here RAN NODE UE ID, such that is also relevant to the SLH.

In case that multiple applications (clients) on a UE use the same port, for identifying a specific application is also needed an application identifier (APP ID) and eventual other identifiers depending on the operating system.

UE Address

Currently the UE IP address(es) or Ethernet address (es), native or assigned by the SMF (Session Management Function) is (are) communicated to the Uu-UE through a NAS (Non-Access Stratum) message, passing through the base station.

In an embodiment of this invention the RAN node analyses the NAS messages sent to an Uu-UE or SL-UE by the Core System and adds to the UE context the information contained within the NAS message regarding the IP address (s), or Ethernet address (es) native (assigned at fabrication) or assigned by the cellular system or by an application.

In an embodiment of this invention the UE is assigned, by an application or server connected to the RAN node, with layer 3 (for example IP Address) and/or Layer-2 address (for example a sidelink Layer-2 address or an Ethernet address) or with other unstructured identifiers or names.

The name UE ADDRESS includes, but is not limited to, the addresses or names or identifiers used to indicate the source UE or the target or target UE for a data packet.

UE Address Information

In an embodiment of this invention the Uu-UE or the SL-UE sends an RRC message to the serving RAN node, named here UE ADDRESS INFORMATION including the information of the UE addresses used by the applications/PDU (Packet Data Unit) sessions for communicating with the UE.

Alternatively, the serving RAN node can request a UE through an RRC message named here UE ADDRESS INFORMATION REQUEST to provide the configured or native UE addresses.

When the UE address is reconfigured, the UE sends to the connected RAN node(s) an RRC UE ADDRESS MODIFICATION message including the new UE address(es).

In this way, the base station or the SLH knows which UE address(es) are used by the UEs served by it.

In an embodiment of this invention a RAN node (base station or SLH) stores the UE address(es) related to a specific UE within the specific UE-related context information or in a separate data block.

In another embodiment of this invention is defined a new procedure, named here WHERE_UE_IS, of the X2 or Xn or Xns logical interface, through which a source RAN Node questions other RAN nodes, after first looking for the UE ADDRESS in its internal data base. The source RAN Node provides the UE ADDRESS associated with a specific UE within the WHERE_UE_IS REQUEST message sent to the target neighbor RAN nodes.

In its response, in case that the target RAN Node has found a matching UE ADDRESS in its internal data base, the target RAN Node sends to the source RAN Node the UE ID used by the target RAN Node for communications regarding the specific UE on X2 or Xn or Xns interface.

Alternatively, or in addition, the target RAN Node sends to the source RAN node the RAN NODE UE ID used for accessing internally the specific UE information data block, together with all the UE ADDRESSES used by the UE and with the identifier of the target RAN Node on X2/Xn/Xns interface.

The source RAN Node shall create a neighbor UE context (data block) including the received information regarding the UE ID used by the target RAN Node for communications regarding the specific UE on X2 or Xn or Xns interface, or the RAN NODE UE ID used for accessing internally the specific UE information data block, together with all the UE ADDRESSES used by the UE and with the identifier of the target RAN Node on X2/Xn/Xns interface.

In case that the UE address does not match any of the UE ADDRESSES reported by the connected UEs, the target node will return over X2/Xn a response message in WHERE_UE_IS FAILURE message indicating UE address not found.

As a variant, the source node can send over X2/Xn/Xns interface a UE_ADDRESS_REQUEST message to each neighbor RAN node for requesting the neighbor RAN node to provide for each served UE the information of all UE ADDRESS-es.

In the positive response UE_ADDRESS_RESPONSE, the target RAN Node provides for each served UE the UE ID used by the target RAN Node for communications regarding the specific UE on X2 or Xn or Xns interface or the RAN NODE UE ID used for accessing internally the specific UE information data block, together with all the UE ADDRESSES used by the UE and with the identifier of the target RAN Node on X2/Xn/Xns interface.

Application Address on UE

Each packet at application layer contains a source address and a destination address. At layer 3, both addresses are IP addresses and an application (usually named application client for Uu-UEs) running on UE uses a port number in addition to the UE IP address.

When only Layer 2 is used, an application-specific Layer 2 address is used also as UE ADDRESS.

The address of the application running on a UE is named in this invention UE APP ADDRESS.

Preparation of Application-Specific Local Forwarding Between UEs

The Application Server, already connected to the application layer of each UE, asks the source UE and the target UE, through the application layer, to establish a direct PDU session between them, where each UE is identified by its UE ADDRESS.

In an embodiment, the Application Server provides the application (its clients) in each UEs with a challenge code for this connection, which will be later used by the application clients and/or the serving or connected RAN nodes for validating the direct communication request.

The Application Server establish which UE will be the source and which UE will be the communication target (pair).

The application layer (client) on the source UE, identified by its UE APP ADDRESS and UE APP ID, communicates over the internal Vertical Interface with the source UE and asks it to connect to the target UE and to the application layer (client) on the target UE, identified by the target UE APP ADDRESS and UE APP ID.

The source UE initializes the WHERE_UE_IS procedure, for finding the RAN Node to which the target UE is connected.

The WHERE_UE_IS initial message is an RRC message between the source UE and the serving RAN node and includes at least the source UE ADDRESS, the pair target UE ADDRESS and eventually the challenge code IEs (Information Element).

After receiving the WHERE_UE_IS initial message, the serving RAN node of the source UE sends a message on X2/Xn/Xns interface including at least its identifier and the target UE ADDRESS to each neighbor RAN node, possibly without analyzing the type or the meaning of the target UE ADDRESS.

The RAN node to which the target UE is connected asks through an RRC message the target UE, while providing the source UE ADDRESS, UE APP ADDRESS and UE APP ID, to provide the challenge code at the application level as prove of legitimate empowerment of the Application Server for the direct local communication within RAN with the source UE.

The local application on the target UE retrieves in parallel the challenge code or a mathematical derivation of it from its application server.

At this point, the local application on the target UE should determine that the challenge code received from the Application Server and the challenge code received from the target UE, over the Vertical Interface, correspond one to each other.

If the challenge codes are validated by the local application on the target UE or if the validation is delegated to the local application on the source UE, the process continues; if the challenge codes do not correspond one to each other on the target UE, an error message is sent to the application on the source UE through the serving RAN nodes.

The local application on the source UE should validate the direct connection with the local application on the target UE while using the challenge code provided by the local application on the target UE.

In addition, also the involved RAN nodes should exchange information validating the direct connection between the served UEs.

In an embodiment, the target UE provides the challenge code received directly from the Application Server through an RRC message to the serving RAN node.

In another embodiment, the target UE provides the challenge code received from the first UE through an RRC message to the serving RAN node.

The serving RAN node of the target UE returns in a message to the serving RAN node of the source UE, its identifier for communication over the X2/Xn/Xns interface and an acknowledge that indeed it serves the target UE using the UE ADDRESS specified within the WHERE_UE_IS message.

In an embodiment, the challenge code provided by the target UE is transmitted by the RAN node serving the target UE, to the RAN node serving the source UE.

The RAN node serving the source UE sends an RRC message to the source UE acknowledging that the connection with the target UE has been established and providing the challenge code received from the target UE.

In turn, the source UE announces the local application, through a message over the Vertical Interface, that the local RAN communication has been established and provides the challenge code received from the target UE.

The local application on the source UE validates the challenge code received from the target UE.

In an embodiment, at least one of: RAN node serving the source UE, RAN node serving the target UE compares the challenge codes received from the source and target UEs and assess whether the source UE and the target UE are connected to the same Application Server and are requested by the Application Server to communicate within the RAN.

In an embodiment the local application of the source UE confirms to the source UE, over the Vertical Interface, that the connection with the local application is approved.

The approval is transmitted by a message to the RAN node serving the source UE.

The RAN node serving the source UE sends a message over X2/Xn/Xns interface to the RAN node serving the target UE acknowledging that the connection with the source UE has been established and approved.

The target UE announces the local application, through a message over the Vertical Interface, that the local RAN communication with the application on the source UE has been established and approved.

One or both applications on the one or both UEs announce the Application Server that the direct connection within RAN has been established and confirmed.

While in the previous description was considered that the application layer is located on UE, it is possible that the application layer is located on a connected device or controller connected to the UE.

In continuation, it is possible to apply the RAN FORWARDING procedure, further described, between the source UE and the target UE for defining the QoS (Quality of Service) parameters of forwarding operation.

In an embodiment of this invention, the connectivity between UEs belonging to different MNOs (Mobile Network Operator) can be done through local forwarding between RAN serving nodes belonging to different MNOs.

Once the UE-to-UE communication was enabled on the control plane, it is possible to exchange user packets from source to destination and/or from destination to the source in unicast or multicast modes while using the user plane.

The RAN FORWARDING procedure can be also applied in URLLC broadband applications, for example in gamming or virtual reality.

UE-to-UE User Plane

For example, in an embodiment of this invention an SLH obtains, through a UE_ADDRESS_REQUEST message to one or more neighbor SLHs, all UE addresses used by SL-UEs connected to the neighbor SLH.

Alternatively, the WHERE_UE_IS REQUEST includes as UE ADDRESS an IE meaning "Any address" of target UEs.

In a first example use case, Uu-UE-1 communicates with Uu-UE-2 through its serving base station BS-1 and SL-UE-1 communicates with SL-UE-2 through its connected SLH-1.

The UE-to-UE communication over one or two SLHs may be needed because SL-UE-1 was not able to establish a connection over the sidelink air interface to SL-UE-2, for example due to different operating frequencies or large path attenuation.

An application running on source Uu-UE-1 or on source SL-UE-1 can send a data packet to a pair application running on target Uu-UE-2 or on target SL-UE-2, by using the source and target/destination local application (client) addresses.

In a first use case the source and target UEs are served by the same RAN node, while in a second use case the source and target UEs are served by different RAN nodes.

BS-1 or SLH-1 check, using the stored source and target UE addresses, whether the Uu-UE-2 or SL-UE-2 are connected to the same BS-1 or respectively SLH-1; if yes (first use case), it is determined, preferably by using the challenged code provided by the Application Server, as explained before, when the direct connection is approved at application layer.

If the direct connection is approved at application layer, this information is transmitted to the RAN node through an RRC message, from the respective UE to the RAN node; in case that the RAN node is split in a CU and a DU, the RRC message is sent from the DU serving the UE to the CU.

The data packet as it is or the data packet with an appended QoS header is forwarded, without exiting BS-1 or respectively SLH-1, to the Uu-UE-2 or respectively SL-UE-2.

However, this simple operation is part of a new PDU session, with its own data rate and QoS requirements, PDU session which was not established through the Core network.

In an embodiment of this invention, the source UE creates and transmits to the serving/connected RAN node, through an AS (Access Stratum) RRC message, information regarding:

A. PDU Session ID (Identifier); this ID may be allocated by the source UE or by the source RAN Node.

B. S-NSSAI (Single Network Slice Selection Assistance Information) for the new PDU session.

C. PDU Session Resources set-up request including maximum, minimum and/or average data rate, for each direction: from source UE to the target UE and from target UE to the source UE.

D. Standardized QFI, if there is a match between the information received over the V-Interface from the connected application layer and the standardized QFI values;

Otherwise, time-domain behavior and latency limitations for each traffic direction.

UE Security capabilities.

In the second use case, Uu-UE-1 connected to BS-1 communicates with Uu-UE-2 connected to BS-2 or SL-UE-1 connected to SLH-1 communicates with SL-UE-3 connected to SLH-2.

When an application running on Uu-UE-1 or on SL-UE-1 sends a data packet to a pair application running on Uu-UE-2 or on SL-UE-3, BS-1 or SLH-1 check, using the stored UE UP transport addresses, whether the Uu-UE-2 or SL-UE-3 are connected to another BS or SLH.

Further, BS-1 or SLH-1, which are source RAN Nodes, check to which specific BS or specific SLH is connected Uu-UE-2 or SL-UE-3 having the destination address specified by the header of the message sent by the source Uu-UE-1 or SL-UE-1, considered as source UE.

As result of checking, BS-1 or SLH-1 find out that Uu-UE-2 or SL-UE-3, considered as target UE, is connected to respectively BS-2 or SLH-2, which become target RAN Node.

The source RAN Node sends a request to the target RAN Node for establishing a logical connection between the source UE served by the source RAN Node and the target UE served by the target RAN Node.

After the successful establishment of the logical connection, the data packet generated by the source UE as it is, or the data packet with an appended QoS header, is forwarded from BS-1 or SLH-1 (source RAN Node), to the respective target RAN Node over X2 or Xn or Xns logical interface.

In an embodiment of this invention packets belonging to X2 or Xn or Xns interface can be transmitted over a sidelink physical connection.

The local application on the source UE provides data packets where the destination address is the address of the local application on the target UE.

The PDCP layer of the source UE executes header compression for these addresses and the header decompression is necessary at the receiving source RAN node for forwarding the packet to the second RAN node.

In a first approach the source RAN node executes the PDCP sub-layer for obtaining the entire data packet and the target RAN Node treats the incoming packet as a regular packet arriving from the Core network or from its SDAP layer, does the regular layer 2 and layer 1 processing (PDCP, RLC, MAC, PHY) and forwards the packet over the appropriate air interface (Uu or SL) to the target Uu-UE-2 or SL-UE-3.

In a second approach the source UE executes the PDCP protocol, including header compression and encryption and sends to the source RAN node through an RRC message the target UE and local application address or an index to a table containing this information. In addition, it sends some parameters requested for the decryption of the message in UE-to-UE communication.

The source UE may add a SDAP header to the data packet.

In a third approach, in a UE-to-UE PDU session, the PDCP layer of the transmitting Uu-UE or SL-UE executes header compression, encryption and integrity protection based on rules specific to SL communication, while using a UE context information, containing security and integrity protection keys specific to SL communication. The source RAN node receives from the RLC layer the PDCP PDU and in an embodiment of this invention sends it directly to the target RAN node.

PDCP Layer Operation in UE-to-UE Communication

When setting the UE-to-UE direct communication through RAN nodes it will be needed to specify the type of PDCP layer operation within the source and target UE and within the source and target RAN node:

A. Type of PDCP stack in each UE: as for Uu air interface or as for SL air interface. The selection depends on the UE capabilities of supporting a specific PDCP stack(s). An RRC message will transmit to the base station or SLH the PDCP capabilities of the UE and another RRC message will transmit to both source UE and destination UE the selected type of PDCP stack.

B. PDCP operation within the RAN nodes: B1: full execution, recommended for the Uu PDCP type, where each UE has its own security keys and header compression index; B2: none of header compression and security and integrity protection, as the RAN node acts only as relay in case of selected SL PDCP stacks in both UEs.

C. In case that source UE and target UE are connected to the same gNB-DU or SLH-DU or gNB-SLH-DU, the source PDCP PDU forwarding to the target UE should be preferably within the DU, for achieving minimum communication delay.

RAN Forwarding Message

As an embodiment of this invention, a new procedure related to inter-RAN node communication for forwarding user data is added for the Control Plane to 3GPP TS 36.423 and/or to 3GPP TS 38.423 or future similar standards.

This procedure is named here "RAN FORWARDING" wherein a RAN node can be a base station or an SL Hub or other future RAN entity.

This procedure supports RAN-internal communication between UEs without using the forwarding executed by the Core System/Network.

In an embodiment of this invention a Uu-UE connected to a base station over Uu interface can communicate within RAN, as mentioned before, or through the Core System/Network, with an SL-UE connected to an SL Hub.

In a similar mode, an SL-UE connected to an SLH over SL interface can communicate within RAN, as mentioned above, or through the Core System/Network, with a Uu-UE connected to a base station.

An example of using such embodiment is a car with an SL-UE connected to an SL HUB, in fact an RSU in the road case, and communicating with one or more Uu-UEs, for example one or more smartphones belonging to pedestrian users and connected to a base station.

The pedestrians and the vehicles in the proximity of each other may be identified by an application based on their position, transmitted within application layer messages from the UEs to the Application Server.

The corresponding target UE ADDRESS (es), is included in, or part of, the target application client address may be in fact provided by the Application Server to the Application Clients in each target UE.

The SL-UE may be identified by a Layer-2 address of the SL-UE on the SL/PC5 Interface or by its Layer-3 address.

The source RAN Node initiates the procedure by sending the RAN FORWARDING REQUEST message to the target NG-RAN node. When the source NG-RAN node sends the RAN FORWARDING REQUEST message, it shall start a timer.

Upon reception of the RAN FORWARDING REQUEST ACKNOWLEDGE message, the source NG-RAN node shall stop this timer and terminate the RAN FORWARDING procedure.

The source NG-RAN node should include in the RAN FORWARDING REQUEST a PDU Session ID provided by the source UE or by the source RAN node or a DRB ID and a QFI/5QI and S-NSSAIs pertinent to this PDU session.

If any of the PDU Session ID, DRB, 5QI/QFI or S-NSSAIs are not included, the target UE can include them in the RAN FORWARDING ACKNOWLEDGE MESSAGE.

The target NG-RAN node could forward the data packet from the source UE to the target UE while using the keys for security (encryption) and integrity protection of the target UE or of the UE-to-UE communication.

The target NG-RAN node shall report in the RAN FORWARDING ACKNOWLEDGE MESSAGE the successful establishment of the requested PDU session resources. When the target NG-RAN node reports the unsuccessful establishment of a PDU session resource, the cause value should be precise enough to enable the source NG-RAN node to know the reason for the unsuccessful establishment.

The FORWARDING REQUEST message includes a number of information elements for requesting allocation of resources, in an IE named PDU Session Resources To Be Setup List IE.

If the PDU Session Aggregate Maximum Bit Rate IE (Information Element), including the peak aggregated data rate of the PDU session, is included in the PDU Session Resources To Be Setup List IE contained in the FORWARDING REQUEST message, the target RAN Node shall store the received PDU Session Aggregate Maximum Bit Rate within target UE context and use it when enforcing traffic policing for at least one of: Non-GBR QoS flows or GBR QOS FLOWS for the target UE.

For each QoS flow for which the source RAN Node proposes to perform forwarding of data from the source UE, the source RAN Node shall include the Source Forwarding IE set to "Source forwarding proposed" within the Data Forwarding Info from source NG-RAN node IE in the PDU Session Resources To Be Setup List IE in the FORWARDING REQUEST message.

For each PDU session that the target RAN Node decides to admit the data forwarding for at least one QoS flow, the target RAN Node includes the PDU Session level source data forwarding GTP-U Tunnel Endpoint IE within the Data Forwarding Info from target NG-RAN node IE in the PDU Session Resource Admitted Info IE contained in the PDU Session Resources Admitted List IE in the FORWARDING REQUEST ACKNOWLEDGE message.

For each DRB (Data Radio Bearer) for which the source RAN Node proposes to perform forwarding of source data, the source RAN Node shall include the DRB ID IE and the mapped QoS Flows List IE within the Source DRB to QoS Flow Mapping List IE contained in the PDU Session Resources To Be Setup List IE in the FORWARDING REQUEST message.

The source RAN Node may include the QoS Flow Mapping Indication IE in the Source DRB to QoS Flow Mapping List IE to indicate that only the target generated or source generated QoS flow is mapped to the DRB.

If the target NG-RAN node decides to use the same DRB configuration and to map the same QoS flows as the source NG-RAN node, the target NG-RAN node includes the Source Forwarding GTP Tunnel Endpoint IE within the Data Forwarding Response DRB List IE in the FORWARDING REQUEST ACKNOWLEDGE message to indicate that it accepts the proposed forwarding of source data for this DRB.

If the target RAN Node does not admit at least one PDU session resource, or a failure occurs during the Forwarding Preparation, the target NG-RAN node shall send the FORWARDING REQUEST FAILURE message to the source NG-RAN node. The message shall contain the Cause IE with an appropriate value.

A FORWARDING CANCEL procedure can be sent to cancel a preparation of a FORWARDING or a FORWARDING process pertinent to the source UE and target UE.

Application Interaction with the Core Network

In an embodiment of this invention, the Application Function (AF), or a system manager, for example the Line Controller and Manager-310, can activate the client-to-client direct communication through the RAN nodes, based on application clients addresses, without passing through the Core Network, by using the Network Exposure Function (NEF) in the Core Network for activating the UE-to-UE direct communication through the RAN nodes with the QoS parameters desired by the AF.

The AF (named previously Application Server) indicate to each relevant application client that is enabled to communicate through the serving RAN Node with a pair application client or with a group of application clients, identified by their addresses.

The NEF sends a message to the SMF (Session Management Function), which may allocate a PDU session for this communication, together with a QFI or a new set of QoS parameters, as requested by the application.

The SMF transmits a message to AMF, which transmits the request for direct communication and its QoS parameters to the RAN Node servicing the UE hosting the source client and to the RAN Node servicing the UE hosting the target application client.

The RAN nodes execute the UE-to-UE connection and provide success feedback when the application client on the source UE is connected to the application client on the target UE.

The success feedback may be sent back to AMF and from AMF to SMF and from SMF to NEF and from NEF to AF.

In this embodiment may be also used a challenge code, as previously explained, however given that the radio network was directly requested by the AF to execute this connection, the challenge code is not really needed.

Management Unit/Non-Real Time Controller

An important question is: what happens when the factory topology of the machines is changed for accommodating a new product? Should this involve a re-design of the radio network?

An embodiment of this invention includes a management unit which for each specific deployment and use case, which establishes the software configuration of the functionality, radio spectrum and radio protocols for each RAN Node connected to a specific sensor, specific actuator, specific local controller, specific higher-level controller, specific Human-Mashie Interface (HMI), specific RR, specific AGV.

Another embodiment of this invention includes the downloading, by the RAN Node, of the software modules selected by the management unit in case of configuration or product change.

Another embodiment of this invention includes the integration, by the RAN Node, of the downloaded software modules selected by the management unit such to operate as a single well integrated RAN Node.

In case that the RAN Node or a part of it is virtualized on a computing platform, the software modules selected by the management unit will be downloaded and integrated such to become functional on the computing platform.

Vertical Interface

The Vertical Interface connects, within the same entity, or between different entities, the application layer with the radio layer.

The first functionality of interest is the synchronization of operation between a PLC and the connected devices, synchronization related to stringent timing.

To ensure the synchronization, the tasks at application level are scheduled and triggered by timers.

The parameters of the traffic belonging to a PDU session to be provided in messages over the V Interface are:

A. Type of traffic: periodic or aperiodic or both

B. For deterministic periodic traffic:
   a. Pattern of the traffic: regular or pattern-based
      i. For regular traffic: the time interval between transmissions
      ii. For pattern-based traffic: time resolution and time pattern, eventually expressed as bitmap
   b. Required transfer interval by the wireless network, as single value or as string of values corresponding to each transmission in the pattern
   c. Amount of transferred data per transmission; if the amount is variable, indicate the maximum, minimum and average amount.

C. For bursty (non-deterministic) traffic
   a. Minimum, maximum, and average time interval between transmissions
   b. Required transfer interval by the wireless network, in case that is required
   c. Amount of transferred data per transmission; if the amount is variable, indicate the maximum, minimum and average amount.

D. Direction of transmission: uplink (towards the RAN Node) or downlink (from a RAN Node)

E. Direction of received data: downlink (from a RAN node) or uplink (from a UE).

The above parameters, together with the type of interface (SL or Uu) are used by a RAN Node or by a Radio Controller to determine the time-frequency resources to be allocated for each PDU session.

In response, a Radio Node or a Radio Controller can send a message over the V-Interface to the connected application layer to report success in the assignment of radio resources, or to propose some alternate parameters, or to report a failure and a cause for failure.

Other functions of V-Interface include:
a. Providing or receiving a UE ADDRESS for unicast or groupcast communication;
b. Providing a code to one or more UEs (may be a challenge code, as explained above)
c. Providing a group identifier to a group of UEs and eventually the layer 2 address of the group leader
d. Providing security and integrity protection parameters to the communicating RAN nodes, to be used especially in:
   i. Sidelink communication
   ii. Inter-serving RAN nodes communication, not using IP Sec between their routers.

System Configuration

The line controller and/or manager includes the list of the hierarchical entities, including the relevant operational applications in each entity and the wired and wireless connections of each entity.

Each entity is characterized by at least:

A. One general identifier.

B. For the possible wired connections: their name (or code) and for each one the Layer-2 identifier.

Layer-2 identifiers of wired connections and their status (used or not).

C. For the possible wireless connections: their name (or code) and for each one at least the Layer-2 identifier (address), RAT, operational frequency channels for each RAT, max. transmission power in each channel, etc.

Operational function code at high level, for example sensor, actuator, I/O box, drive, machine, controller, HMI, etc.

Operational function code—second level: temperature meter, temperature switch, pressure meter/switch, accelerometer, level meter/switch, image acquisition, etc.

In an embodiment of this invention all entities include an SL air interface operating in FR2 spectrum.

MEC Platform

As shown in FIG. 6, a MEC (Mobile Edge Computing) platform-603 on which are virtualized the relevant Application Servers, for example one or more PLCs or V2X/D2D applications together with the higher layers of the radio protocols for one or more base stations and one or more SLHs, is suitable for deployment and coverage of relatively small areas, as production facilities or road intersections.

The MEC platform can be connected to a Public Core Network (CN)-601, belonging to Operator A, and to a Private CN-602.

On a single MEC platform can be virtualized the RAN protocols, including the S1/NR protocol for communication with the Core System, the X2/Xn/Xs protocols for East-West communication between RAN Nodes, RRC, SDAP, PDCP, RLC, MAC and High PHY for both Uu and SL air interfaces.

The Vertical Interface, the Radio Controller, when implemented on the MEC platform, will work faster as compared with the non-virtualized communication.

Uu Remote Radio Heads (RRH) public-604 and private-606, and SL RRH, public-605 and private-607 will be placed in the vicinity of the machines, in production applications, or in road intersections, for vehicular applications. In addition, it can be used an SL RRH-608 operating in V2X dedicated bands.

The connection of the RRHs to the MEC platform can be wired or wireless.

Deployment Example Using MEC Platform(s)

In FIG. 7 is presented a combined operational and radio system architecture in a production facility based on RAN Nodes supporting both Uu and SL air interfaces in its private spectrum.

In an embodiment, the MEC platform 603 is directly connected to the RRHs-701, 702 providing support for the SL air interface and to the RRH-703 providing support for the Uu air interface.

In a way each RRH is physical presence replacing a SLH hub in the factory facility. The RRH-701 is connected to the same SL-UEs or Uu-UEs to which was connected a SLH in FIG. 4.

For example, the RRH-701 is connected through the same SL-UE to the HMI-1 (305), S/A-1 (301), R-1 (311), while the RRH-702 is connected through the same SL-UEs to HMI-2 (303) and M1-306.

The RRH-703, is connected through the same Uu-UEs to the I/O Box-4 (304) and HMI-3 (414).

The computing resources, including processor number of cycles or processor time and the required RAM memory for executing the radio functions related to the User Plane, are in practice highly correlated with the required throughput at synchronized time instances.

The Radio Controller is the entity which can provide the detailed requirements of the radio UP to a MEC platform orchestrator, given that the Radio Controller (see FIG. 5), interacts with both the Line Controller and Manager-310 and each Radio Node.

In an embodiment of this invention, the computing platform Manager (Orchestrator) allocates computing resources of the hardware accelerators executing the High PHY functions of the Uu or SL interfaces or both, dynamically, while considering the information provided by the Radio Controller.

In another embodiment of the present invention, the Radio Controller provides to the computing platform Manager the schedule (timing) of the inactive periods of the radio functions for making possible the reduction of energy consumption of the computing platform.

gNB-SLH-DU Implementation

The gNB-SLH-DU blocks shown in FIG. 8 are only by way of example; in practical implementations these blocks can be distributed on multiple circuit boards, and the control functions and hardware functions can be implemented on commercial processors or tailor-made logical arrays, such as system-on-a-chip, FPGAs, ASICs.

The blocks of the gNB-SLH-DU-801 include a controller-802, one or more DSP processors-806 connected to a radio interface-803, providing wireless communication over V2X sidelink and Uu interface with UEs and optionally may include an interface-807 to an RRH including a synchronization signal.

The network (communication) interface-804 enables message transmission over the network, to gNB-CU or SLH-CU or gNB-SLH-CU or to the OAM (Operations, Administration and Maintenance).

The controller-802 includes a common MAC sublayer for assigning time-frequency resources to the wireless connection of a first UE while using a Uu technology and to the connection of a second UE while using the SL/PC5 technology including some functions such as scheduling of the reference signals and obtaining reports from a UE.

The controller-802 also supports the forwarding of user data belonging to at least one of: Uu or SL air interface protocol layers, based on the corresponding DRB (Data Radio Bear).

A memory block-805, containing, for example, RAM and non-volatile memory (FLASH or ROM) is used by the central control unit-802. The data used by the controller-802 may be stored in the memory block-805.

SLH or SLH-DU Implementation

The SLH or SLH-DU blocks shown in FIG. 9 are only by way of example; in practical implementations these blocks can be distributed on multiple circuit boards, and the control functions and hardware functions can be implemented on commercial processors or tailor-made logical arrays, such as system-on-a-chip, FPGAs, ASICs.

The blocks of the SLH or SLH-DU-901 include a DSP processing unit-906, a radio interface-903, providing wireless communication over sidelink with a UE, and the network (communication) interface-904 enabling message transmission over the network, to another SLH or SLH-DU or to the OAM (Operations, Administration and Maintenance) or to a Central Unit of a base station or to a base station.

The controller-902 may include, as a subset of its functions, some functions such as scheduling of the reference signals, configuring time-frequency resources on the sidelink interface for the SLH or for connected UEs and obtaining reports from an SL-UE. A memory block-905, containing, for example, RAM and non-volatile memory (FLASH or ROM) is used by the central control unit-902.

When the SLH-DU is connected to a gNB-SLH-CU, the controller-902 transmits RRC messages encapsulated over the F1 interface, while differentiating between RRC messages relevant for the SL/PC5 interface operation and RRC messages relevant to general management of SLH-DU operation.

UE Block Diagram

FIG. 10 shows a UE block diagram, according to an embodiment of the invention. A central radio control block, implemented on one of the device processors, including the functions related to the PHY control and MAC layers of the Uu air interface and/or sidelink air interface, is located within a central control unit-1002, which may also perform other high-layer user services, including, for example, connecting a Vertical Interface between the radio layer and the application layer.

One or more processors can be used for executing the user applications.

The user interfaces, such as the display, speaker, and microphone, are located in an optional user interface block-1001.

A memory block-1007, containing, for example, RAM and non-volatile memory (FLASH or ROM) is used by the central control unit-1002 and depending on the actual UE implementation, may be used also by the user interfaces-1001.

Digital signal processing, including UE synchronization, is performed by a signal processing block-1003 which can provide modulated signals to the radios using TDD or FDD for communication, such as radios-1004, for the sidelink operation in licensed and un-licensed bands, and eventually also to other radios-1006, such as WiFi and Bluetooth, operating in license-exempt bands. Antennas-1005 can be used for receive (RX) and transmit (TX), while using, for example, diplexers or switches.

Computing Platform

A computing platform, according to one embodiment of the invention, is schematically illustrated in FIG. 11. The computing platform-1101 consists of one or more processors-1102, non-volatile memory-1103, volatile memory-1105, hardware accelerators for executing at least a part of the radio functions-1107, and a network communication interface-1104. An application, program or process may run over an operating system installed in the computing platform 1101.

The computing resources of a computing platform can be dynamically allocated, by a computing platform controller or manager, to one or more computing virtual partitions, such that each computing virtual partition can use a number of processor cycles, a sub-set of hardware accelerators, and a partition of the volatile and non-volatile memory. The system controller/manager-1106 may run over a processor or a virtual machine.

Technologies

The description of this inventions uses terminology currently available for the 5G-NR technology. It shouldn't be considered that the invention is limited to this deployment mode, i.e. the sub-layers included in an SLH-DU may be included in a virtualized SLH or in a non-virtualized SLH and the description is also pertinent to these deployment options.

The SLH-CU can be virtualized on the same platform with the gNB-CU, such that the deployment of SLH-CU does not preclude to have it as part of gNB-CU, with or without UP-CP separation.

The deployment can use the LTE technology, such that eNB corresponds to gNB, X2 interface corresponds to Xn interface, MME corresponds to AMF, S-GW corresponds to UPF.

As will be appreciated by those skilled in the art, the terminology used throughout the specification is mainly that which is associated with LTE and 5G standards. However, it should be understood that embodiments of the present invention encompass other cellular technologies as the SLH using DSRC or IEEE 802.11 technology and its associated stations.

SLH using IEEE 802.11 technologies can be controlled at layer 3 by an F1/F S/Xn/Xns protocol while using IEEE 802.11 air protocol at layer 1 and layer 2.

Both TDD and FDD duplexing modes can be used as well as un-licensed and licensed frequency bands.

The examples provided show certain ways of carrying out the invention. It is to be understood that invention is not intended to be limited to the examples disclosed herein. Rather, the invention extends to all functionally equivalent structures, methods and uses, as are within the scope of the claims.

LIST OF ABBREVIATIONS

5GC 5G Core
5QI 5G QoS Identifier
A/D Analog to Digital
AF Application Function
AGV Automated Guided Vehicle
AM Acknowledged Mode
AMF Access and Mobility Management Function
BS Base Station
BWP BandWidthPart
CN Core Network
CP Control Plane
CU Central Unit
CS Core System
CSI Channel State Information
D2D Device to Device
D/A Digital to Analog
DCI Downlink Control Information
DL-SCH Downlink Shared Channel
DMRS Demodulation Reference Signal
DRB Data Radio Bearer
DU Distributed Unit
E1 Interface between gNB-CU-CP and gNB-CU-UP
E6 Interface between SLH-CU-CP and SLH-CU-UP
eNB evolved Node B
F1-U F1 User plane interface
F1-C F1 Control plane interface
F1AP F1 Application Protocol
FDD Frequency Division Duplex
FFT Discrete Fourier Transform
FS Interface between SLH-CU and SLH-DU
gNB new generation Node B
GTP GPRS Tunneling Protocol
HARQ Hybrid Automatic Repeat Request
HMI Human Machine Interface
IE Information Element
ID Identifier
I/O Input/Output
IP Internet Protocol
ISO International Organization for Standardization
LTE Long Term Evolution
MAC Medium Access Control
MIB Master Information Block
MEC Mobile Edge Computing
MME Mobility Management Entity
MT Machine-type Terminal
NAS Non-Access Stratum
NEF Network Exposure Function
NR New Radio (aka 5G)
OAM Operation and Maintenance
PDCP Packet Data Convergence Protocol PDU Packet Data Unit
PHY Physical
PLC Programmable Logic Controller
PLMN Public Land Mobile Network
PRB Physical Resource Block
QFI QoS Flow Identifier
QoS Quality of Service
RF Radio Frequency
RLC Radio Link Control
RNTI Radio Network Temporary Identifier
RRC Radio Resource Control
RRH Remote Radio Head
RS Reference Signal
RSRP Reference Signal Received Power
RSRQ Reference Signal Received Quality
SCS Sub-Carrier Spacing
SLH Side Link Unit
SD Slice Differentiator
SDAP Service Data Adaptation Protocol
SIB System Information Block
SINR Signal to Interference and Noise Ratio
SL Sidelink
SMF Session Management Function
S-NSSAI Single Network Slice Selection Assistance Information
SPS Semi-Persistent Scheduling
SR Scheduling Request
SRS Sounding Reference Signal
SS Synchronization Signal
SSB SS/PBCH block
TB Transport Block
TM Transparent Mode
UM Un-acknowledged Mode
UP User Plane
UPF User Plane Function
URLLC Ultra-Reliable Low-Latency Communication
USIM Universal Subscriber Identity Module
V2X Vehicle to Everything
Xn-U Xn-User plane
XnAP Xn Application Protocol
Xns Interface between gNB and SLH

The invention claimed is:

1. A method for cellular radio network operation, comprising:
assigning to a first User Equipment (UE) a first UE address and to a second UE a second UE address;
connecting a first application client on the first UE and a second application client on the second UE to a specific application server;
requesting by the application server to connect the first UE, served by a first RAN (Radio Access Network) node, with the second UE, served by a second RAN node;
identifying the second RAN node by the first RAN node;
establishing, through the first and the second RAN nodes, a connection within RAN between the first application client on the first UE and the second application client on the second UE; and
conveying user data between the first application client on the first UE and the second application client on the second UE through the first RAN node and the second RAN node.

2. The method according to claim 1, wherein the first UE address and/or the second UE address and/or the first application client address and/or the address of the second application client can be an IP address, an Ethernet address, a sidelink Layer 2 address or an unstructured address or name.

3. The method according to claim 1, wherein the request of the specific application server is transmitted at application layer to at least one of: the first application client on the first UE or the second application client on the second UE.

4. The method according to claim 3, wherein the first application client on the first UE conveys the connection request through a message, transmitted over a vertical interface between the application layer and the first UE.

5. The method according to claim 4, wherein the first UE conveys the connection request through a message transmitted to the first serving RAN node.

6. The method according to claim 5, wherein the first RAN node establishes a connection with the second RAN node serving the second UE by exchange of messages over a logical interface connecting the two RAN nodes.

7. The method according to claim 6, wherein the first RAN node determines the identity of the second RAN node by questioning the neighbor RAN nodes through one or more messages containing the second UE address or the second application client address.

8. The method according to claim 1, wherein the first RAN node determines the identity of the second RAN node serving the second UE from a message received from the Core Network.

9. The method according to claim 1, wherein the specific application server requests the Core Network to establish direct communications between the first application client and the second application client.

10. The method according to claim 1, wherein forwarding user data from the first UE to the second UE includes creating a PDU (Packet Data Unit) session for the specific application data transmission through the first and second serving RAN nodes.

11. The method according to claim 10, wherein the PDU session set-up request for the specific application data transmission through the first and second serving RAN nodes includes the standardized QOS Flow Identifier or at least one of: throughput characteristics, time-domain behavior or latency limitations for at least one traffic direction.

12. The method according to claim 1, wherein establishing a connection within RAN between the first UE and the second UE through the first and the second serving RAN nodes includes providing, by the application server, a challenge code to be sent by one of the pair UEs: the first UE and the second UE, to the application client on the other pair UE, for proving that the connection between the application clients was requested by the specific application server.

13. The method according to claim 1, wherein one of the pair UEs: the first UE or the second UE uses a radio interface not allowing direct wireless communication with the pair UE.

14. The method according to claim 1, wherein the first RAN node and the second RAN node are the same RAN node and a data packet of the application client, transmitted by one of the pair UEs: the first UE or the second UE, with or without an appended Qos header, is forwarded, without exiting the RAN node, to the application client on the pair UE.

15. The method according to claim 5, wherein the message used by the first UE to convey the connection request is an RRC message transmitted to the first serving RAN node.

16. Apparatus for deployment in a cellular network, in which is assigned a first UE (User Equipment) address to a first UE and a second UE address to a second UE and a first application client on the first UE and a second application client on the second UE are connected to a specific application server, and it is requested by the specific application server to connect the first UE, served by the said apparatus, with the second UE, served by a specific RAN (Radio Access Network) node, the apparatus comprising:
- at least one network interface;
- a memory; and
- at least one processor, which is configured to operate as controller of the said apparatus, being operational to:
  - establish a wireless connection between the said apparatus and the first UE,
  - determine the identity of the second RAN node serving the second UE,
  - establish a connection within RAN, between the first UE and the second UE through the said apparatus and the specific RAN node, wherein the user data is conveyed through the said apparatus and through the specific RAN node, between the first application client on the first UE and the second application client on the second UE.

17. The apparatus according to claim 16 wherein the at least one processor is configured to operate as a controller of a sidelink hub.

18. The apparatus according to claim 16 wherein the at least one processor is configured to operate as a controller of a base station.

19. A User Equipment (UE) apparatus for deployment in a cellular network, wherein the UE apparatus is assigned with a first UE address and another UE is assigned with another UE address, and a first application client on the said UE apparatus and a second application client on the other UE are connected to a specific application server, and it is requested by the specific application server to connect the said UE apparatus, served by a first RAN (Radio Access Network) node, with the other UE, served by a second RAN node, and the second RAN node serving the other UE is identified by the first RAN node, the apparatus comprising:
- at least one radio, which is configured to communicate over the air with at least one base station, by using a cellular radio interface (Uu) between a UE and a base station, or is configured to communicate over the air with at least one sidelink hub by using a cellular sidelink radio interface;
- a signal processing block, configured to acquire synchronization with the at least one base station or with the at least one sidelink hub; and
- at least one processor, which is configured to operate as a controller of the said UE apparatus, being operational to establish a connection within RAN, between the first application client and the second application client, through the first RAN node and the second RAN node, and to convey user data between the first application client on the UE apparatus and the second application client on the other UE through the first and second RAN nodes.

20. The apparatus according to claim 19, wherein the processor is configured to execute control functions of the sidelink wireless interface.

21. The apparatus according to claim 19, wherein the processor is configured to execute control functions of the Uu wireless interface connecting a UE to a base station.

* * * * *